US009366234B2

(12) United States Patent
Sanchez et al.

(10) Patent No.: US 9,366,234 B2
(45) Date of Patent: Jun. 14, 2016

(54) APPARATUS AND METHODS FOR RECOVERY OF VARIATIONAL WIND ENERGY

(71) Applicants: James Michael Sanchez, Rochester, NY (US); John M. Hammond, Livonia, NY (US)

(72) Inventors: James Michael Sanchez, Rochester, NY (US); John M. Hammond, Livonia, NY (US)

( * ) Notice: Subject to any disclaimer, the term of this patent is extended or adjusted under 35 U.S.C. 154(b) by 66 days.

(21) Appl. No.: 14/455,917

(22) Filed: Aug. 10, 2014

(65) Prior Publication Data

US 2015/0285223 A1    Oct. 8, 2015

Related U.S. Application Data

(60) Provisional application No. 61/864,560, filed on Aug. 10, 2013.

(51) Int. Cl.

| B60L 11/12 | (2006.01) |
|---|---|
| H02P 9/04 | (2006.01) |
| F03D 9/00 | (2016.01) |
| F03D 9/02 | (2006.01) |
| F03D 11/02 | (2006.01) |
| F03D 5/06 | (2006.01) |
| H02N 2/18 | (2006.01) |
| F02B 63/04 | (2006.01) |
| H02J 7/34 | (2006.01) |

(52) U.S. Cl.
CPC .. *F03D 9/02* (2013.01); *F03D 5/06* (2013.01); *F03D 9/002* (2013.01); *F03D 11/02* (2013.01); *H02J 7/34* (2013.01); *H02N 2/185* (2013.01); *F05B 2220/707* (2013.01); *F05B 2260/40* (2013.01); *F05B 2260/407* (2013.01); *H02J 7/345* (2013.01); *Y02E 10/70* (2013.01); *Y02E 10/722* (2013.01); *Y02E 10/725* (2013.01)

(58) Field of Classification Search
USPC .............................................. 290/1 R, 50, 55
See application file for complete search history.

(56) References Cited

U.S. PATENT DOCUMENTS

| 3,500,451 | A | * | 3/1970 | Yando | ..................... F23Q 3/002 |
|---|---|---|---|---|---|
| | | | | | 310/330 |
| 4,184,805 | A | * | 1/1980 | Arnold | ...................... F03D 5/06 |
| | | | | | 416/1 |
| 4,387,318 | A | * | 6/1983 | Kolm | .................... F03B 13/141 |
| | | | | | 310/330 |
| 4,396,852 | A | * | 8/1983 | Hunt | ........................ F03D 5/00 |
| | | | | | 310/329 |

(Continued)

OTHER PUBLICATIONS

SP Beeby et. al.,"A Micro electromagnetic generator for vibration energy harvesting," J. Mcromech. Microeng., 17 (2007) 1257-1265. EFS file name 20150310_14-455917_IDS_NPL_Cite1.

(Continued)

*Primary Examiner* — Pedro J Cuevas
(74) *Attorney, Agent, or Firm* — John M. Hammond; Patent Innovations LLC

(57) ABSTRACT

A wind energy recovery apparatus and related methods are disclosed. The apparatus is comprised of a first wind receiving member displaceable by a wind having a variable velocity, a first elastic member coupled to the first wind receiving member, and an electrical generator operatively connected to the first wind receiving member and configured to convert mechanical energy of the first wind receiving member to electrical energy. An energy storage device may be provided in communication with the electrical generator. A self-powered signal communications system including the apparatus is also disclosed. A method of identifying a site for recovering variational wind energy is also disclosed.

19 Claims, 17 Drawing Sheets

(56) References Cited

U.S. PATENT DOCUMENTS

| | | | | |
|---|---|---|---|---|
| 4,418,533 A * | 12/1983 | Folsom | F02G 1/0435 | 60/517 |
| 4,461,968 A * | 7/1984 | Kolm | H01H 57/00 | 200/181 |
| 4,467,236 A * | 8/1984 | Kolm | H01L 41/1138 | 310/321 |
| 4,536,674 A * | 8/1985 | Schmidt | F03D 5/00 | 310/330 |
| 5,223,763 A * | 6/1993 | Chang | H02N 2/185 | 310/339 |
| 6,153,944 A * | 11/2000 | Clark | F03B 17/06 | 290/54 |
| 6,172,426 B1 * | 1/2001 | Galich | F03G 7/08 | 290/1 R |
| 6,273,680 B1 * | 8/2001 | Arnold | F03B 17/00 | 416/1 |
| 6,351,999 B1 * | 3/2002 | Maul | G01F 1/3209 | 356/439 |
| 6,376,925 B1 * | 4/2002 | Galich | F03G 7/08 | 290/1 R |
| 6,424,079 B1 * | 7/2002 | Carroll | H02N 2/185 | 310/339 |
| 6,798,090 B2 * | 9/2004 | Cheung | H02K 35/02 | 290/1 A |
| 7,199,480 B2 * | 4/2007 | Fripp | E21B 41/0085 | 290/1 R |
| 7,208,845 B2 * | 4/2007 | Masters | E21B 41/0085 | 290/1 R |
| 7,224,077 B2 * | 5/2007 | Allen | F03D 5/00 | 290/1 R |
| 7,231,874 B2 * | 6/2007 | Rastegar | F41H 11/02 | 102/207 |
| 7,439,657 B2 * | 10/2008 | Clingman | H01L 41/1134 | 310/332 |
| 7,504,764 B2 * | 3/2009 | Chang | H02N 2/18 | 310/329 |
| 7,530,761 B2 * | 5/2009 | Kenney | F01D 17/26 | 404/17 |
| 7,573,143 B2 * | 8/2009 | Frayne | F03B 17/06 | 290/1 R |
| 7,576,454 B2 * | 8/2009 | Cheung | B82Y 25/00 | 310/12.12 |
| 7,626,279 B2 * | 12/2009 | Brown | F03G 7/08 | 290/1 R |
| 7,626,281 B2 * | 12/2009 | Kawai | F03D 5/06 | 290/1 R |
| 7,649,276 B2 * | 1/2010 | Kornbluh | F03B 13/1845 | 290/42 |
| 7,772,712 B2 * | 8/2010 | Frayne | F03B 5/00 | 290/1 R |
| 7,821,144 B2 * | 10/2010 | Frayne | F03B 17/06 | 290/1 R |
| 7,847,421 B2 * | 12/2010 | Gardner | F03G 7/08 | 290/1 E |
| 7,986,051 B2 * | 7/2011 | Frayne | F03B 17/06 | 290/1 E |
| 8,026,619 B2 * | 9/2011 | Frayne | F03B 17/06 | 290/1 R |
| 8,030,786 B2 * | 10/2011 | Jackson | H02K 7/1853 | 290/1 E |
| 8,102,072 B2 * | 1/2012 | Tsou | F03D 5/00 | 290/55 |
| 8,142,154 B2 * | 3/2012 | Gartner | F03B 5/00 | 416/132 A |
| 8,183,746 B2 * | 5/2012 | Rastegar | F42C 11/008 | 102/207 |
| 8,258,644 B2 * | 9/2012 | Kaplan | F03B 17/06 | 290/54 |
| 8,272,839 B2 * | 9/2012 | Gartner | F03B 17/00 | 416/132 A |
| 8,390,137 B2 * | 3/2013 | Bryfogle | H02K 7/1876 | 290/1 R |
| 8,432,049 B2 * | 4/2013 | Jung | F03B 13/262 | 290/1 R |
| 8,519,554 B2 * | 8/2013 | Kaplan | F03B 17/06 | 290/1 R |
| 8,525,390 B2 * | 9/2013 | Allaei | H02N 2/185 | 310/319 |
| 8,541,927 B2 * | 9/2013 | Hayamizu | A01K 85/01 | 310/339 |
| 8,669,667 B1 * | 3/2014 | Dupra | H02K 35/00 | 290/1 R |
| 8,680,752 B2 * | 3/2014 | Ayazi | F03G 7/08 | 310/339 |
| 8,786,113 B2 * | 7/2014 | Tinnen | E21B 41/0085 | 290/1 R |
| 8,836,156 B2 * | 9/2014 | Neifeld | F03B 17/06 | 290/54 |
| 8,841,788 B2 * | 9/2014 | Sampaio | F03B 13/16 | 290/42 |
| 9,000,689 B2 * | 4/2015 | Gialdella | H02K 53/00 | 318/115 |
| 9,222,465 B2 * | 12/2015 | Thorp | F03D 9/002 | |
| 2003/0197433 A1 * | 10/2003 | Cheung | H02K 35/02 | 310/14 |
| 2005/0230974 A1 * | 10/2005 | Masters | E21B 41/0085 | 290/1 R |
| 2006/0064972 A1 * | 3/2006 | Allen | F03D 5/00 | 60/369 |
| 2007/0052302 A1 * | 3/2007 | Cheung | B82Y 25/00 | 310/12.12 |
| 2007/0210580 A1 * | 9/2007 | Roberts | F03G 7/08 | 290/1 R |
| 2008/0048455 A1 * | 2/2008 | Carney | F03D 5/00 | 290/54 |
| 2008/0129254 A1 * | 6/2008 | Frayne | F03B 17/06 | 322/3 |
| 2008/0164701 A1 * | 7/2008 | Brown | F03G 7/08 | 290/1 E |
| 2008/0164702 A1 * | 7/2008 | Brown | F03G 7/08 | 290/1 E |
| 2008/0224477 A1 * | 9/2008 | Kenney | F01D 17/26 | 290/1 R |
| 2008/0277941 A1 * | 11/2008 | Bowles | E21B 41/0085 | 290/54 |
| 2008/0297119 A1 * | 12/2008 | Frayne | F03B 5/00 | 322/3 |
| 2009/0179433 A1 * | 7/2009 | Kenney | F01D 17/26 | 290/1 R |
| 2009/0295163 A1 * | 12/2009 | Frayne | F03B 17/06 | 290/54 |
| 2009/0309362 A1 * | 12/2009 | Frayne | F03B 17/06 | 290/44 |
| 2010/0045119 A1 * | 2/2010 | Jackson | H02K 35/02 | 310/20 |
| 2010/0207395 A1 * | 8/2010 | Frayne | F03B 17/06 | 290/54 |
| 2010/0236440 A1 * | 9/2010 | Rastegar | F42C 11/008 | 102/209 |
| 2010/0276939 A1 * | 11/2010 | Clynes | F03D 5/06 | 290/55 |
| 2011/0084489 A1 * | 4/2011 | Kaplan | F03B 17/06 | 290/54 |
| 2012/0153624 A1 * | 6/2012 | Sampaio | F03B 13/16 | 290/53 |
| 2012/0235417 A1 * | 9/2012 | Arntz | F03D 5/00 | 290/55 |
| 2013/0076272 A1 * | 3/2013 | Gialdella | H02K 53/00 | 318/14 |
| 2014/0097621 A1 * | 4/2014 | Kassianoff | B63H 1/36 | 290/55 |
| 2014/0175800 A1 * | 6/2014 | Thorp | F03D 9/002 | 290/55 |
| 2014/0375063 A1 * | 12/2014 | Neifeld | F03B 17/06 | 290/55 |
| 2015/0207436 A1 * | 7/2015 | Lee | H02N 2/186 | 310/339 |
| 2015/0214880 A1 * | 7/2015 | Gialdella | H02P 25/027 | 318/14 |

(56) References Cited

U.S. PATENT DOCUMENTS

| | | | | |
|---|---|---|---|---|
| 2016/0010619 A1* | 1/2016 | Phillips | ............... | F03B 13/16 290/53 |
| 2016/0076521 A1* | 3/2016 | Olsen | ............... | F03D 9/002 290/55 |
| 2016/0078857 A1* | 3/2016 | Sheng | ............... | G10K 11/02 290/1 R |

OTHER PUBLICATIONS

Raichle et al., "Wind resource assessment of the Southern Appalachian Ridges in the Southeastern United States," Renewable and Sustainable Energy Reviews 13 (2009) 1104-1110. EFS file name 20150310__14-455917_IDS_NPL_Cite2.
Wang et al., "A Low-Power, Linear, Permanent-Magnet Generator/Energy Storage System," IEEE Transactions on Industrial Electronics, vol. 49, No. 3, Jun. 2002. EFS file name 20150310__14-455917_IDS_NPL_Cite3.
Jung et al., "Feasibility Study on an New Energy Harvesting Electromagnetic Device Using Aerodynamic Instability," IEEE Transactions on Magnetics, vol. 45, No. 10, Oct. 2009. EFS file name 20150310__14-455917_IDS_NPL_Cite4.
Global Energy Concepts LLC, "New Mexico Wind REsource Assessment," Sandia National Laboratories, Feb. 2003. EFS file name 20150310__14-455917_IDS_NPL_Cite5.
Elmes et al., "Maximum Energy Harvesting Control for Oscillating Energy Harvesting Systems," IEEE publication 1-4244-0655, Feb. 2007. EFS file name 20150310__14-455917_IDS_NPL_Cite6.
B.Joyce, "Development of an Electromagnetic Energy Harvester for Monitoring Wind Turbine Blades," Master of Science Thesis, Virginia Polytechnic Institute, Dec. 12, 2011. EFS file name 20150310__14-455917_IDS_NPL_Cite7.
French et al., "Geometric and Material Optimization of Vortex-Induced Vibration Micro Energy Harvesters for Localized Wind Environments," Proceedings of ASME 2012 6th International Conference on Energy Sustainability, Jul. 26, 2012. EFS file name 20150310__14-455917_IDS_NPL_Cite8.
Zuo et al., Large scale vibration energy harvesting, Journal of Intelligent Material Systems and Structures, Jun. 7, 2013. EFS file name 20150310__14-455917_IDS_NPL_Cite9.
K. Mok, "Harnessing the Wind's Vibrations for Electricity," Treehugger.com Internet publication, May 29, 2010. EFS file name 20150310__14-455917_IDS_NPL_Cite10.
Lux et al., "Generative Textiles for Non-Rotary Power Production From Wind" Proceedings of the ASME 2012 6th International Conference on Energy Sustainability, Jul. 23-26, 2012, San Diego, CA. EFS file name 20150310__14-455917_IDS_NPL_Cite11.
Abraham et al., "Experimental Test of Multi-Stage Vertical-Axis Turbines for Cellular Communication Applications," Proceedings of the ASME 2012 6th Annual Conference on Energy Sustainability, Jul. 23-26, 2012, San Diego, CA. EFS file name 20150310__14-455917_IDS_NPL_Cite12.
Polinder, et. al., "Modeling of a Linear PM Machine Including Magnetic Saturation and End Effects: Maximum Force-to-Current Ratio," IEEE Transactions on Industry Applications, vol. 39, No. 6, Nov./Dec. 2003. EFS file name 20150310__14-455917_IDS_NPL_Cite13.

\* cited by examiner

APPARATUS AND METHODS FOR RECOVERY OF VARIATIONAL WIND ENERGY

CROSS-REFERENCE TO RELATED PATENT APPLICATIONS

This application claims priority from U.S. provisional patent Application No. 61/864,560 filed Aug. 10, 2013, the disclosure of which is incorporated herein by reference.

BACKGROUND

1. Technical Field

Renewable energy sources, and more particularly, recovery of energy from wind.

2. Description of Related Art

Wind energy recovery has a long history spanning many centuries. The uses for recovered wind energy include the milling grain, pumping water from sources, transferring water between source and use locations, and, more recently, the generation of alternating current electrical power.

In spite of recent progress in alternative energy technologies such as solar energy and wind energy, there remains a need for further improvement in these technologies in order to make them economically viable as compared to current energy sources such as fossil fuels and nuclear power. This has become even more evident with the recent major advances made in hydrofracturing technology, which have enabled the recovery of large reserves of shale gas and oil. Ideally, any improvements in these alternative energy technologies would be sufficiently significant to enable wind energy in a competitive business climate. With regard to wind energy in particular, what is needed is an improvement in the methods of recovering wind energy, which enables cost-competitive use of wind energy, either as an energy supply directly into the commercial AC power grid, or as a "specialty energy" source that supplies energy in specific but commonly encountered circumstances in a more reliable and cost-effective manner than other alternatives.

SUMMARY

An analysis by the Applicants of the recovery of energy from wind in the uses cited above, and other uses, reveals that energy is recovered from the average velocity component of wind. The large mass nature of most bladed wind recovery systems results in large inertial resistance to rapid wind velocity, or density, changes. Even smaller rotational wind recovery systems have blades with significant mass relative to the mass of a typical volume element of wind in variation. Hence, over time, wind energy containing the medium and high frequency components of variation is lost to inertial forces, and only that component of wind energy related to the steady state, average, wind velocity is recovered.

Hence, both modern and historical methods of wind energy recovery have foregone the recovery of the energy contained within rapid, wind energy variation: variation due either to near-ground medium and high frequency velocity fluctuations, or, rapid density variations that might occur near, for example, the region of intersection of a large body of water and a land mass.

Wind, as with any signal, contains energy from zero frequency to the highest frequency variations. Accordingly, the following aspects of wind energy recovery are provided in the present disclosure:

A signal processing analogous perspective of wind, including a computer simulation of wind and its variable velocity characteristics.

A computational method of computing wind total energy using signal processing techniques.

A method for computing the relative energy of wind velocity variation to energy of wind average velocity.

A determination of the functional relationship between wind Turbulence Intensity and relative energy from variational and steady wind components.

Quantification of the variation component of wind energy relative to the classical energy recovery of the average velocity of wind.

Methods and apparatus for the recovery, and storage, of variational wind energy. These methods and apparatus are provided in view of the above preceding aspects.

More specifically, in accordance with the present disclosure, the problem of recovering variational wind energy is solved by an apparatus comprising a first wind receiving member displaceable by a wind having a variable velocity, a first elastic member coupled to the first wind receiving member, and an electrical generator operatively connected to the first wind receiving member and configured to convert mechanical energy of the first wind receiving member to electrical energy.

The apparatus may be further comprised of an energy storage device in communication with the electrical generator. The energy storage device may be a battery or an ultracapacitor, or a combination of both devices.

The elastic member may have a force constant that is variable. The force constant of the elastic member may be tunable in response to the variable velocity of the wind, and, to the average wind velocity, enabling variational capture over a wide range of average wind velocities.

The apparatus may be further comprised of a computer in signal communication with the electrical generator and in signal communication with a sensor for measuring displacement of the first wind receiving member. The computer may include an algorithm to control the electrical energy generated by the electrical generator in response to the displacement of the first wind receiving member.

The electrical generator of the apparatus may be comprised of an electromagnet comprising a first portion and a second portion, with the first portion joined to the first wind receiving member and movable with respect to the second portion. In such a configuration, when the first wind receiving member is displaced, the first portion of the electromagnet moves relative to the second portion of the electromagnet so as to convert mechanical energy of the first wind receiving member to electrical energy from the electromagnet. The first portion of the electromagnet may be a magnet joined to the first wind receiving member, and the second portion of the electromagnet may be a coil of an electrical conductor, such that the displacement of the first wind receiving member displaces the magnet within the coil. The displacement of the first wind receiving member and magnet in a first direction generates an electrical potential of a first polarity across first and second ends of the coil, and displacement of the first wind receiving member and magnet in a second direction opposite the first direction generates an electrical potential of a second polarity opposite the first polarity.

The apparatus with the above electromagnetic generator may be further comprised of a first voltage gate in electrical communication with the first end of the coil of electrical conductor and with a first terminal of a first battery, and a second voltage gate in electrical communication with the first end of the coil of electrical conductor and with a first terminal of a second battery, such that motion of the magnet in the first direction causes the first battery to store electrical energy, and motion of the magnet in the second direction causes the second battery to store electrical energy. Alternatively or additionally, the apparatus may include a voltage-inverting device configured to convert the electrical energy from the electromagnet capture and provided as a DC voltage to an AC voltage form compatible with an electrical power transmission grid or for use with 120 VAC appliances. The voltage inverting device may be a transverter in electrical communication with the electrical generator and connectable to an alternating current power grid.

The apparatus with the above electromagnetic generator may be further comprised of a second wind receiving member displaceable by the wind, coupled to a second elastic member, and joined to the second portion of the electromagnet. In such a configuration, when the second wind receiving member is displaced by the variable velocity of the wind, the second portion of the electromagnet is moved relative to the first portion of the electromagnet so as to convert kinetic energy of the second wind receiving member to electrical energy from the electromagnet.

The electrical generator may be a rotary electrical generator, with the apparatus being further comprised of a linkage operatively connected to the first wind receiving member and the rotary electrical generator. In such a configuration, the linkage converts linear motion of the first wind receiving member to rotary motion of the rotary electrical generator. In this configuration, a classical rotary wire winding, similar to that of a standard generator, or DC motor, may be used to convert the rotary motion to DC electrical, rectified, voltage.

Alternatively, the electrical generator may be comprised of a piezoelectric membrane joined to the first wind receiving member such that displacement of the first wind receiving member applies a stress to the piezoelectric membrane, thereby causing an electrical potential across two conductors in electrical communication with the piezoelectric membrane. In such a configuration, the two conductors are connected to an energy storage device in communication with the electrical generator and/or a voltage inverting device configured to convert the electrical energy to an AC voltage form compatible with an electrical power transmission grid. The elastic member that is coupled to the first wind receiving member may be a piezoelectric membrane, such that the elastic member functions as the electrical generator.

Alternatively, the elastic member may be a spring, and in certain embodiments, a variable rate spring.

Alternatively, the elastic member may be an elastic membrane. In certain embodiments, the elastic membrane may form the first wind receiving member.

In other embodiments, the first wind receiving member may comprise a web, with the apparatus being further comprised of a plurality of elastic members holding the web in tension. The plurality of elastic members may be springs. The springs may be metal coil springs, with the apparatus being further comprised of a plurality of magnets. In such a configuration, each magnet is contained within a coil spring such that expansion and contraction of the coil spring relative to the contained magnet generates electrical energy. The coil springs are in electrical communication with an energy storage device, such that the electrical energy generated by the coil springs is stored in the energy storage device and/or conditioned and transferred to an electrical power transmission grid.

In order to obtain optimum energy conversion by the apparatus over a range of wind conditions, the configuration of the wind receiving member of the apparatus may be made variable in response to the variable velocity of the wind. In certain embodiments, the direction of orientation of the wind receiving member relative to the wind velocity is variable. In other embodiments, the surface area of the wind receiving member is variable in response to the variable velocity of the wind. In other embodiments, the shape of the wind receiving member is variable in response to the variable velocity of the wind. In other embodiments, the mass of the wind receiving member is variable in response to the variable velocity of the wind. In other embodiments, combinations of direction, surface area, shape, and mass may be varied to obtain optimum energy conversion by the apparatus.

In certain wind conditions, the wind may be substantially laminar steady flow, i.e., the variation of wind velocity may be such that the energy from wind velocity variation that is available for recovery is low. In such circumstances, the apparatus may include a vortex-causing device configured to increase the velocity variations of the wind impinging upon the first wind receiving member. The increase in velocity variation may be an increase in the amplitude of the wind velocity, i.e. the scalar wind speed component of the wind velocity, or the variation of the directional component of the wind velocity, or a combination of both. Alternatively or additionally, the vortex-causing device may be configured to vary the frequency of velocity variations of the wind impinging upon the first wind receiving member. The variation in frequency may be either an increase in frequency, or a decrease in frequency, i.e., a "tuning" of the frequency to match the force constant of the elastic member.

The Applicants' energy conversion apparatus and methods have a broad range of uses. For example, the apparatus may be used to provide backup power to a cell phone or other signal communications system. According to the present disclosure, therefore, a self-powered signal communications system is provided comprising a mounting structure such as a tower, an antenna joined to the mounting structure, a transceiver in signal communication with the antenna, a controller in signal communication with the transceiver, and one of the Applicants' energy conversion apparatus mounted on the mounting structure. The energy conversion apparatus may include an energy storage device that stores the electrical energy and provides the electrical energy to at least one of the antenna, the transceiver, and the controller. The transceiver may be a signal repeater, and in certain embodiments, a cellular signal repeater used in cell phone communications.

The energy storage device may be comprised of at least one battery. The system may be connectable to a primary electrical power supply, and further comprised of means for detecting failure of the primary electrical power supply in communication with the controller, such that when a failure of the primary electrical power supply occurs, the controller switches the system to continue operation using electrical energy from the energy storage device.

In accordance with the present disclosure, there is also provided a method of recovering variational wind energy comprising exposing an apparatus comprising a wind receiving member coupled to an elastic member to a wind having a variable velocity, thereby causing the wind receiving member to undergo oscillating motion, and converting mechanical energy of the oscillating motion of the wind receiving member to electrical energy. The method may further comprise storing the electrical energy in a storage device, which may include at least one battery.

In certain embodiments, the oscillating motion of the wind receiving member in a first direction produces a first electrical energy having a voltage of a first polarity, and the oscillating motion of the wind receiving member in a second direction opposite the first direction produces a second electrical energy having a voltage of a second polarity opposite the first polarity. In such a configuration, the method may further comprise conditioning the first and second electrical energy and storing the conditioned first and second electrical energy in an energy storage device. In certain embodiments, the first and second electrical energy may be converted to a third electrical energy having an AC voltage form compatible with an electrical power transmission grid, with the method further comprising delivering the third electrical energy to the electrical power transmission grid.

In certain embodiments, the elastic member may have a force constant that is variable, with the method further comprising controlling the force constant to maximize the electrical energy obtained from the apparatus.

In certain embodiments, the apparatus may further comprise an electrical generator operatively connected to the wind receiving member and configured to convert the mechanical energy of the oscillating motion of the wind receiving member to electrical energy. In such circumstances, the method further comprises controlling a resistance load on the electrical generator to maximize the electrical energy obtained from the apparatus.

In certain embodiments, the configuration of the wind receiving member may be variable in response to the variable velocity of the wind, with the method further comprising controlling the configuration of the wind receiving member to maximize the electrical energy obtained from the apparatus. The controlling the configuration of the wind receiving member may include one or more of controlling the direction of orientation of the wind receiving member relative to the wind velocity (such as e.g., pitch and yaw angles), controlling the surface area of the wind receiving member, controlling the shape of the wind receiving member, and controlling the mass of the wind receiving member.

The method may be further comprised of causing increased turbulence in the wind proximate to the wind receiving member, thereby changing the oscillating motion of the wind receiving member, and increasing the electrical energy obtained from the apparatus. The change in oscillating motion may be one or more of increasing amplitude of the oscillating motion, increasing frequency of the oscillating motion, increasing force of the oscillating motion, or changing direction of the oscillating motion.

The Applicants have developed certain numerical analytical methods that enable rational decision making with regard to whether there is sufficient recoverable wind energy from wind velocity variation at a particular site. The Applicants' methods allow a determination that placement of the Applicants' apparatus at a particular site is justifiable in advance of such placement, instead of incurring the cost of apparatus fabrication, transportation, and installment, without knowledge that there is sufficient recoverable wind energy from wind velocity variation for the apparatus to perform its intended overall function, and to do so at a lower cost and in a more reliable manner than other alternatives.

Accordingly, there is provided a method of identifying a site for recovering variational wind energy comprising obtaining wind turbulence data by performing one of collecting wind turbulence data at the wind site or generating wind turbulence data by a numerical simulation of wind at the wind site; calculating a variational wind energy recovery ratio from the wind turbulence data; calculating the maximum theoretical wind energy from wind velocity variation available for recovery at the wind site; and if the maximum theoretical wind energy from variation relative to constant velocity wind energy is above a predetermined threshold value, identifying the site as being suitable for recovering variational wind energy.

BRIEF DESCRIPTION OF THE DRAWINGS

The present disclosure will be provided with reference to the following drawings, in which like numerals refer to like elements, and in which.

Figure 1:
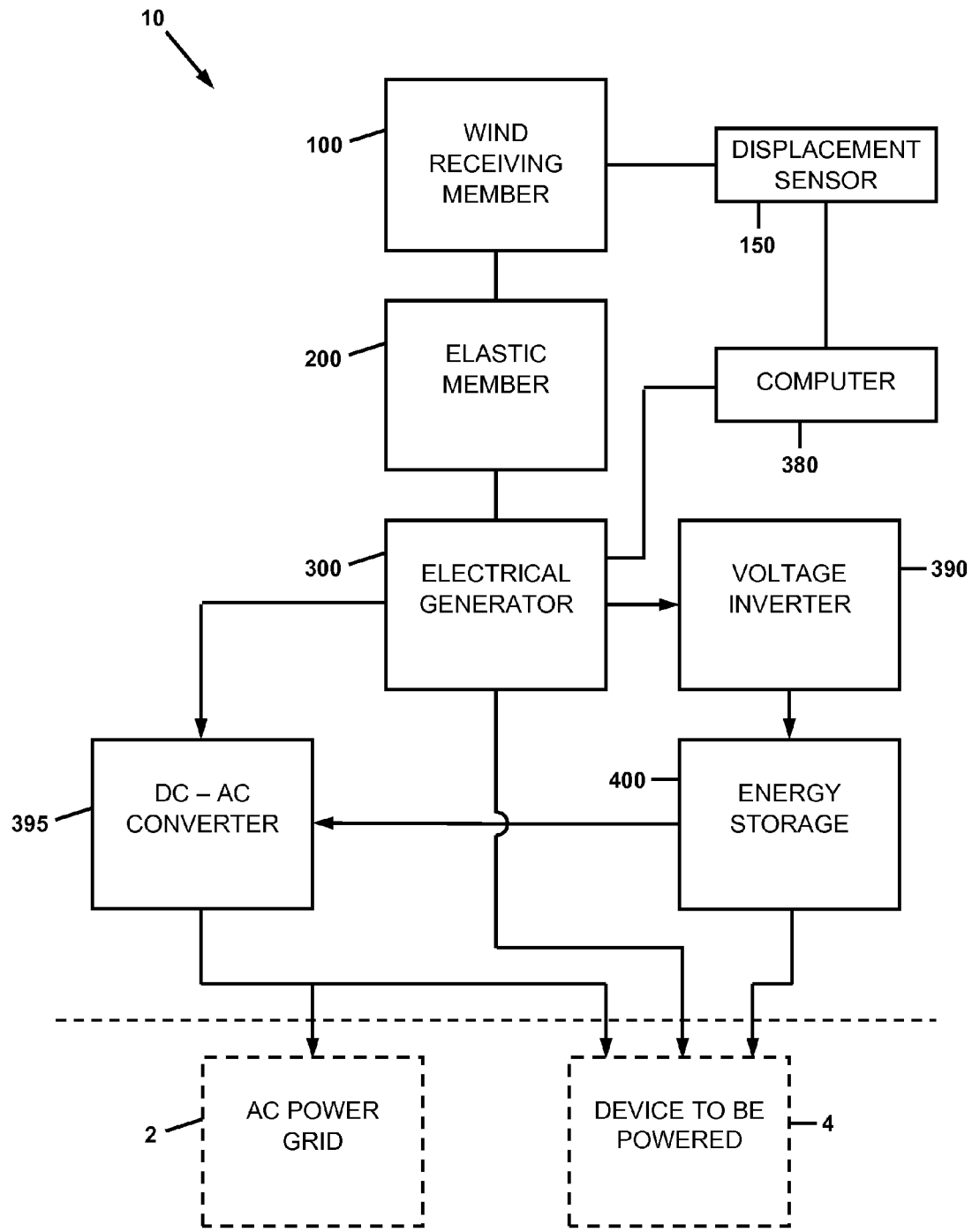
FIG. 1 is a block diagram of an apparatus for recovery of variational wind energy in accordance with the present disclosure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. As used herein, the acronym "VWER" is meant to indicate "variable wind energy recovery,", e.g., in reference to a VWER apparatus and a VWER method.

Turning first to FIG. 1, a block diagram of an apparatus for recovery of variational wind energy is depicted. The apparatus 10 is comprised of a first wind receiving member 100 displaceable by a wind having a variable velocity, a first elastic member 200 coupled to the first wind receiving member, and an electrical generator 300 operatively connected to the first wind receiving member 100 and configured to convert mechanical energy of the first wind receiving member 100 to electrical energy.

The apparatus 10 may be further comprised of an energy storage device 400 in communication with the electrical generator 300. In certain embodiments, the energy storage device 400 may be a battery or an ultracapacitor, or a combination of both devices. The apparatus 10 may include a voltage inverter 395 configured to invert voltages of alternating polarity output by the generator 300, so that all of the generator energy output can be stored in the energy storage device 400.

In certain embodiments, the elastic member may have a force constant that is variable. The force constant of the elastic member may be tunable in response to the variable velocity of the wind.

The apparatus may be further comprised of a computer in signal communication with the electrical generator and in signal communication with a sensor for measuring displacement of the first wind receiving member. The computer may include a central processing unit, a memory, a non-transitory computer storage medium, hard-wired and/or wireless communication means, and input and output interfaces, such as a USB interface. (None of these are explicitly shown in computer 100 of FIG. 1.) The central processing unit and/or the memory and/or the non-transitory computer storage medium may contain an algorithm, which can be executed to control the electrical energy generated by the electrical generator 300 in response to the displacement of the first wind receiving member 100 by the varying velocity of the wind.

The apparatus 10 may be further comprised of a displacement sensor 150 adapted to sense the displacement of the wind receiving member 100. The displacement sensor 150 may be an accelerometer, which senses the acceleration of the wind receiving member 100. Such an accelerometer may be a single axis accelerometer, or a multi-axis accelerometer, depending upon the configuration of the wind receiving member 100.

The displacement sensor 150 may output a signal that is representative of the acceleration of the wind receiving member 100, and may also output signals representative of the velocity and displacement of the wind receiving member 100. The displacement sensor 150 is in signal communication with the computer 380, which may execute algorithms to convert the data from the displacement sensor 150 to wind receiving member velocity and/or displacement data. The displacement sensor data is among the inputs that the computer 380 may use to control the apparatus 10.

In certain embodiments, the apparatus 10 may be used to electrically power a device, particularly in a remote location, or in the event of an electrical power failure. Alternatively or additionally, the apparatus may be comprised of a DC-AC converter 395 configured to convert DC power produced by the generator 300 to an AC voltage that is compatible with a commercial AC power grid 2.

The wind receiving member 100, elastic member 200, and electrical generator 300 function as means for converting mechanical energy of the wind receiving member 100 resulting from impingement of a variable velocity wind to electrical energy. This means for converting mechanical energy to electrical energy may be configured in a variety of ways. Certain embodiments of such means will now be described. It is to be understood that these embodiments are to be considered as exemplary and not limiting; other embodiments will be apparent to those skilled in the art upon a reading of the present disclosure and are to be considered within the scope of the invention.

Figure 2:
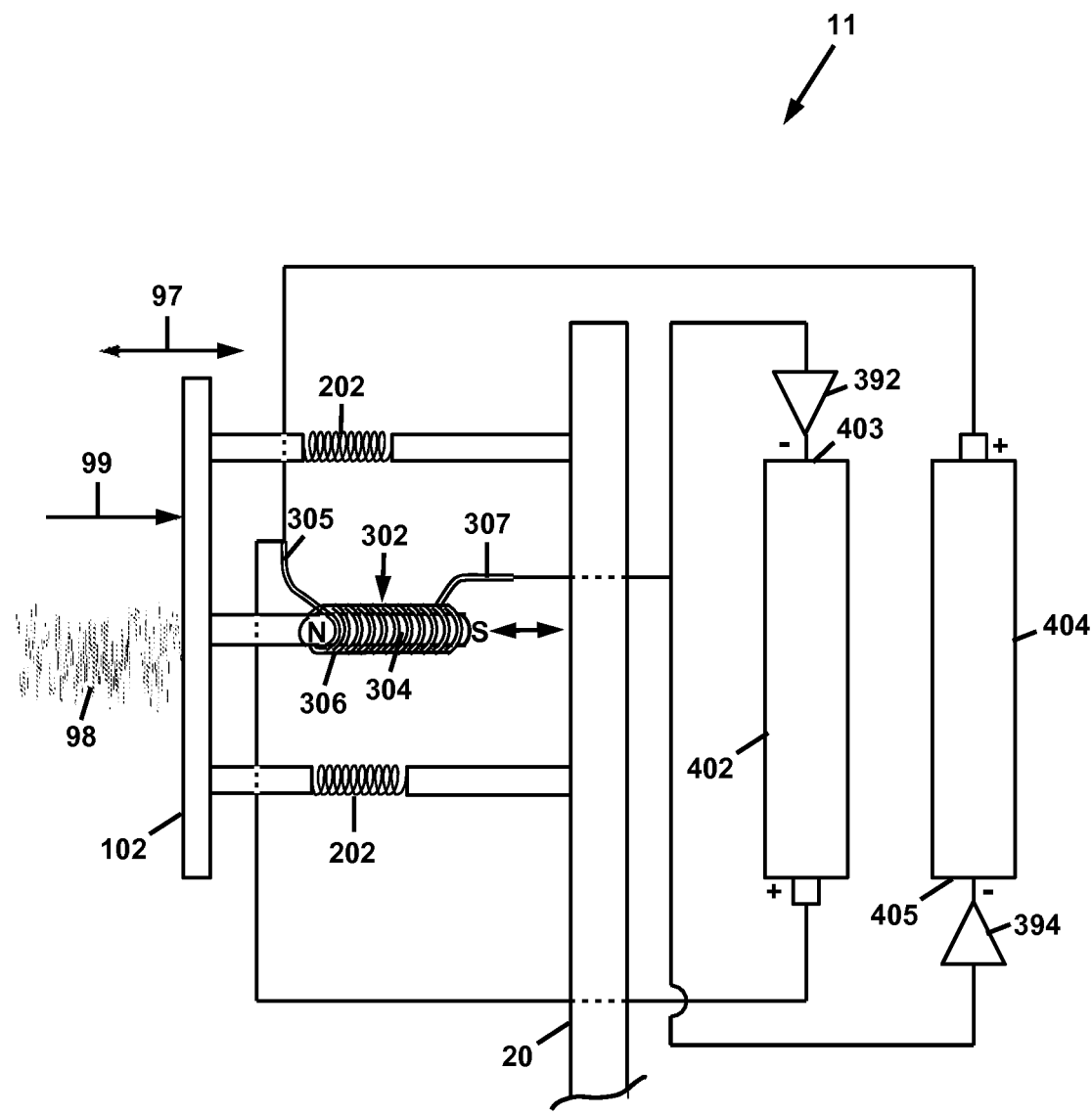
FIG. 2 is a schematic illustration of a first means for converting mechanical wind energy to electrical energy in the Applicants' apparatus of FIG. 1.

FIG. 2 is a schematic illustration of a VWER apparatus 11 comprising a first means for converting mechanical wind energy to electrical energy. VWER apparatus 11 is comprised of a wind receiving member 102, which is displaced by a variable velocity wind indicated by arrow 99 and "noisy velocity signal" 98 indicative of a turbulent or "gusty" wind. The wind receiving member 102 is connected to a support member 20 by additional structural members (not shown), which include bearings so as to allow the wind receiving member 102 to move horizontally in response to being buffeted by variable velocity wind. Under such conditions, in response to variable velocity wind, i.e., wind gusts, the wind receiving member is displaced horizontally. The wind receiving member 102 is operatively connected to elastic members, i.e., springs 202. Thus in response to being buffeted by variable velocity wind, the wind receiving member 102 undergoes oscillatory motion as indicated by bidirectional arrow 97. In certain embodiments, the springs 202 may be variable rate springs, so as to accommodate a wider range of velocity variation of the wind.

The electrical generator 302 of the apparatus 11 may be comprised of an electromagnet comprising a first portion and a second portion. In the embodiment depicted in FIG. 2, the first portion is a magnetic rod 304 joined to the wind receiving member 102, and the second portion is a wound coil 306 of electrical conductor, such as fine copper wire. The magnetic rod 304 is movable within the wound conductor coil 306. In such a configuration, when the wind receiving member 102 is displaced by variable wind, the magnet 304 is displaced within the coil 306, thereby inductively generating electrical energy. As described above, by having the wind receiving member 102 operatively connected to springs 202, the wind receiving member 102 undergoes oscillatory motion in opposed first and second directions indicated by bidirectional arrow 97. The displacement of the wind receiving member 102 and magnet 304 in the first direction generates an electrical potential of a first polarity across first and second ends 305 and 307 of the coil, and displacement of the wind receiving member 102 and magnet 304 in the second direction opposite the first direction generates an electrical potential of a second polarity opposite the first polarity.

So that the electrical energy of opposed polarities may both be stored and subsequently used, in the embodiment depicted in FIG. 2, the apparatus 11 is further comprised of a first voltage gate 392 in electrical communication with the first end 307 of the coil 306 of electrical conductor and with a first terminal 403 of a first battery 402, and a second voltage gate 394 in electrical communication with the first end 307 of the coil 306 of electrical conductor and with a first terminal 405 of a second battery 404. In such a configuration, motion of the magnet 304 in the first direction causes the first battery 402 to store electrical energy, and motion of the magnet 304 in the second direction causes the second battery 404 to store electrical energy. Alternatively or additionally, the apparatus 11 may include a voltage converting device 395 (FIG. 1) configured to convert the electrical energy from the electromagnet 302 to an AC voltage form compatible with an electrical power transmission grid. The voltage inverting device 395 may be a transverter in electrical communication with the electrical generator and connectable to an alternating current power grid.

In a further embodiment (not shown), the apparatus 11 with the above electromagnetic generator 302 may be further comprised of a second wind receiving member displaceable by the wind, coupled to a second elastic member, and joined to the second portion of the electromagnet, i.e. coil 306. In such a configuration, when the second wind receiving member is displaced by the variable velocity of the wind, the coil 306 of the electromagnet 302 is moved relative to the magnet 304 of the electromagnet 302, so as to convert kinetic energy of the second wind receiving member to electrical energy from the electromagnet 302.

Figure 3:
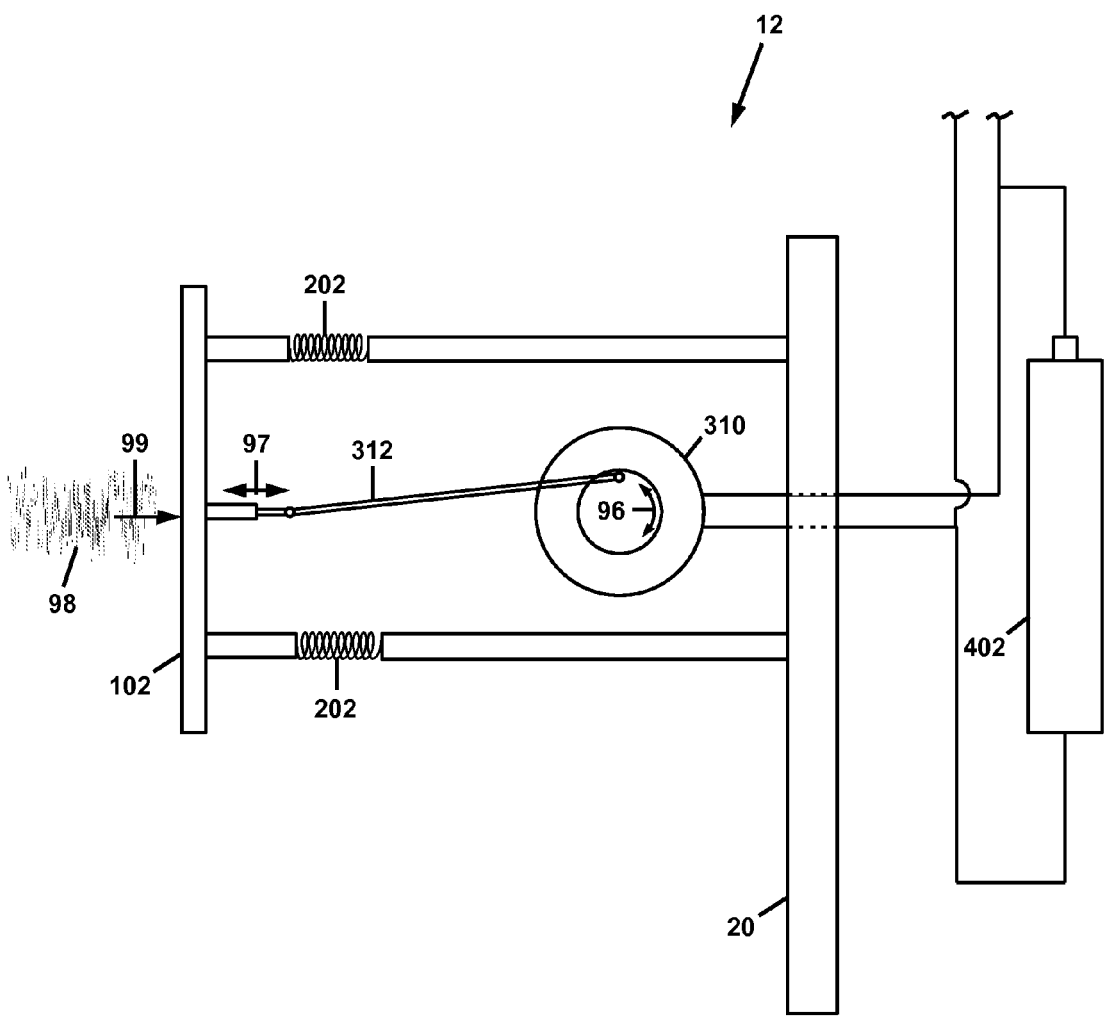
FIG. 3 is a schematic illustration of a second electromagnetic electrical generator that may be used to convert mechanical wind energy to electrical energy in the Applicants' apparatus.

Referring to FIG. 3, and in an alternative embodiment of an apparatus 12 depicted therein, the electrical generator may be a rotary electrical generator 310. The apparatus 12 is further comprised of a linkage 312 operatively connected to the wind receiving member 102 and the rotary electrical generator 310. In such a configuration, the linkage 312 converts linear motion of the wind receiving member 102 to rotary motion of the rotary electrical generator 310. The energy output of the generator may be stored in at least one battery 402.

FIG. 3 offers a standard capture configuration similar to that used when recovering linear motion energy such as rotary wheels applied to waterfalls, and rotary wind devices for an average wind, but, applied to direct impinging variational wind. In this embodiment, using a lever enables a standard coil winding such as that used in a generator to be implemented. Also, small losses associated with the resumption of motion in FIG. 2 at each zenith are avoided.

Depending upon the extent of the displacement of the wind receiving member 102, the rotary electrical generator may achieve a sequence of rotations in one direction. Alternatively, the wind receiving member 102 may not be displaced enough to rotate the generator 310 a full revolution. Instead, the generator 310 may reverse direction as indicated by arcuate arrow 96. In such a configuration, the arrangement of voltage gates 392 and 394, and multiple batteries 402 and 404 may be provided as shown in FIG. 2 and described above.

Figure 4A:
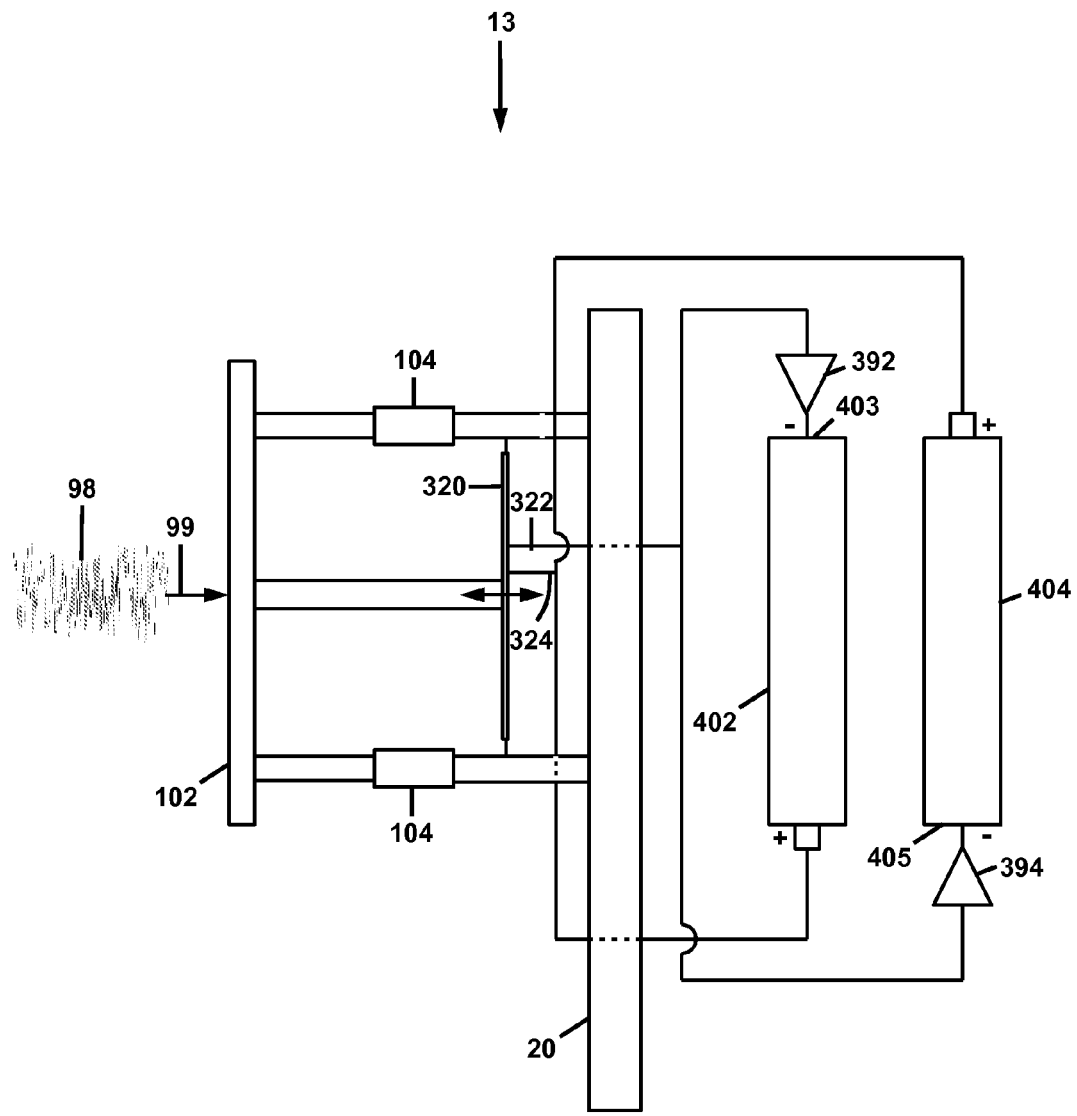
FIG. 4A is a schematic illustration of a first piezoelectric electrical generator that may be used to convert mechanical wind energy to electrical energy.

Referring to FIG. 4A, and in an alternative embodiment of an apparatus 13 depicted therein, the electrical generator may be comprised of a piezoelectric membrane 320 displaced by the wind receiving member 102, such that the wind receiving member 102 applies a stress to the piezoelectric membrane 320, thereby causing an electrical potential across two conductors 322 and 324 in electrical communication with the piezoelectric membrane 320. In such a configuration, the two conductors 322 and 324 may be connected to an energy storage device in communication with the electrical generator and/or a voltage inverting device configured to convert the electrical energy to an AC voltage form compatible with an electrical power transmission grid as described previously. The piezoelectric membrane 320 may function as the elastic member, in which case, the springs 202 (FIG. 2) are not required. Instead, the springs may be replaced by linear bearings 104.

Figure 4B:
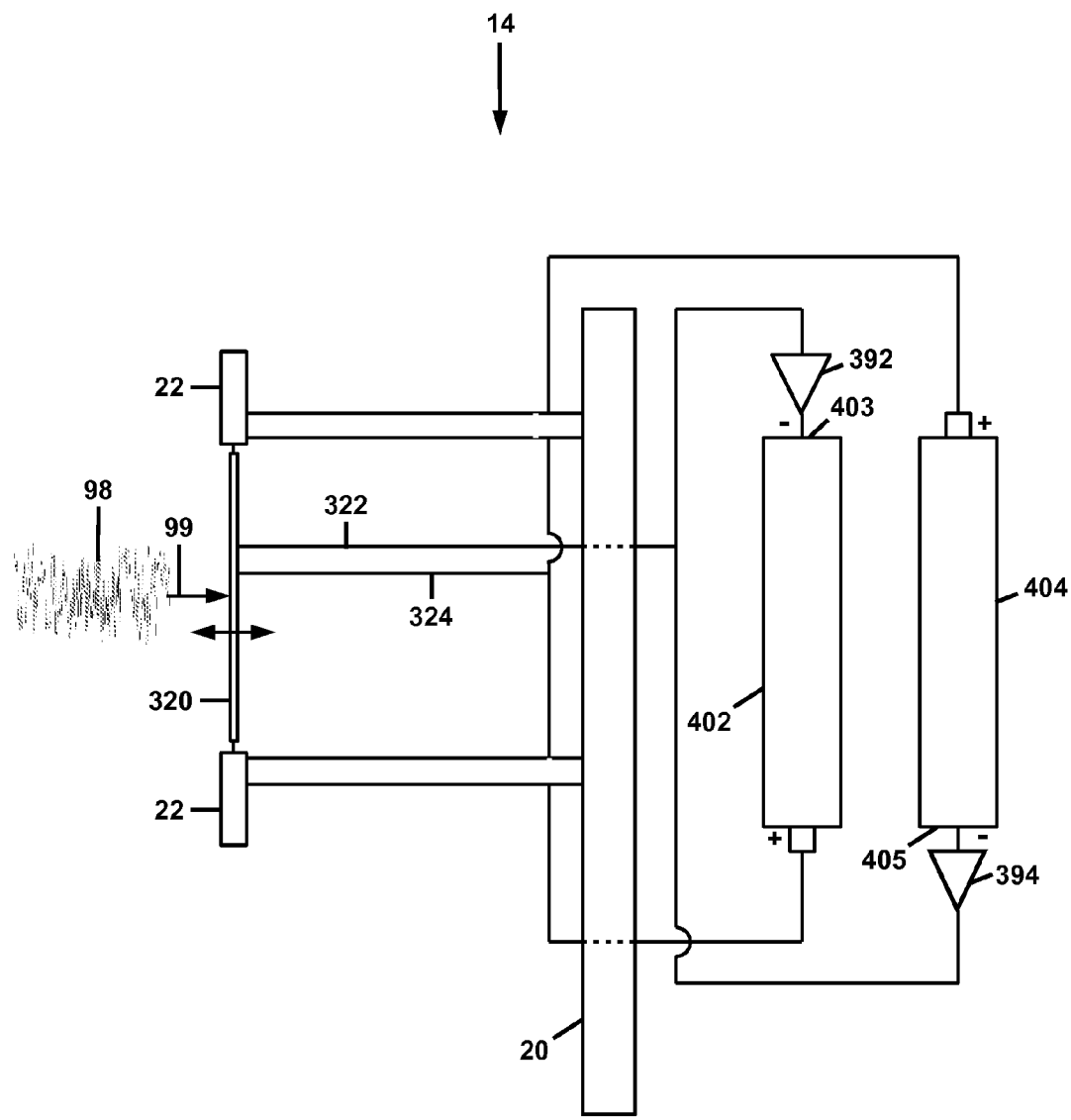
FIG. 4B is a schematic illustration of a second piezoelectric electrical generator that may be used to convert mechanical wind energy to electrical energy.

FIG. 4B depicts an alternative apparatus 14 in which the elastic member forms the wind receiving member is a piezoelectric membrane 320. In such a configuration, the piezoelectric membrane 320 functions as the wind receiving member, the elastic member, and the electrical generator. The piezoelectric member is suspended between structural members 22, which are not configured to move horizontally, but instead are in fixed positions.

Figure 5:
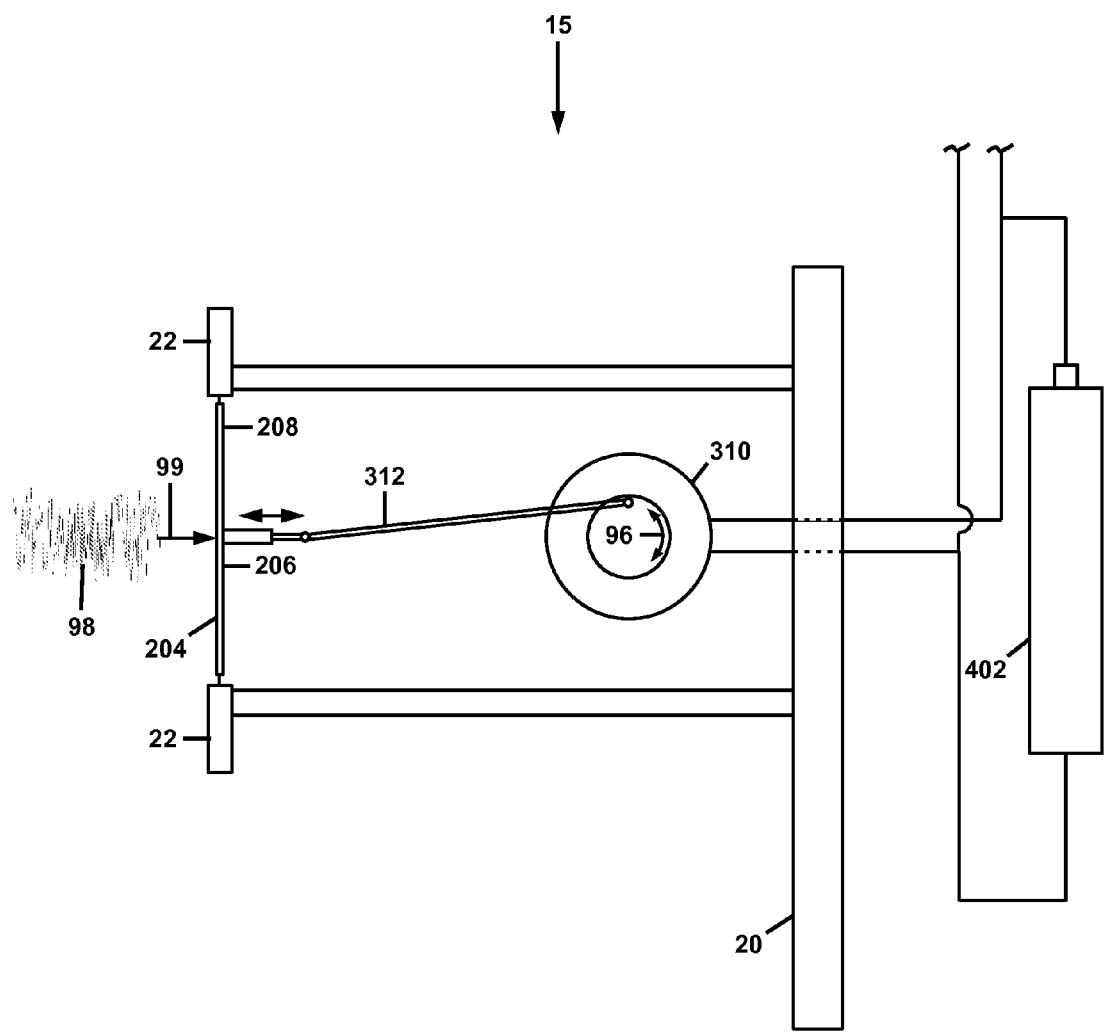
FIG. 5 is a schematic diagram of a portion of one embodiment of the wind energy recovery apparatus, wherein the elastic member of the apparatus is an elastic membrane.

Referring to FIG. 5, and in an alternative embodiment of an apparatus 15 depicted therein, the elastic member of the apparatus may be an elastic membrane 204 that is suspended between structural members 22. In such a configuration, the elastic membrane 204 forms the wind receiving member. In the embodiment of the apparatus 15 depicted in FIG. 5, the elastic membrane 204 is operatively connected to a rotary generator 310, as shown for the apparatus 12 of FIG. 3. Alternatively, the elastic membrane 204 may be connected to an electromagnet as shown for apparatus 11 of FIG. 2.

In certain embodiments, the elastic membrane 204 may be formed with a thickness gradient, which may extend from the central region 206 that is connected to generator linkage 312 to the peripheral region 208. In that manner, the elastic membrane 204 has a variable rate of elasticity, which can thus provide responsiveness to a broader range of variation in wind velocity.

Figure 6:
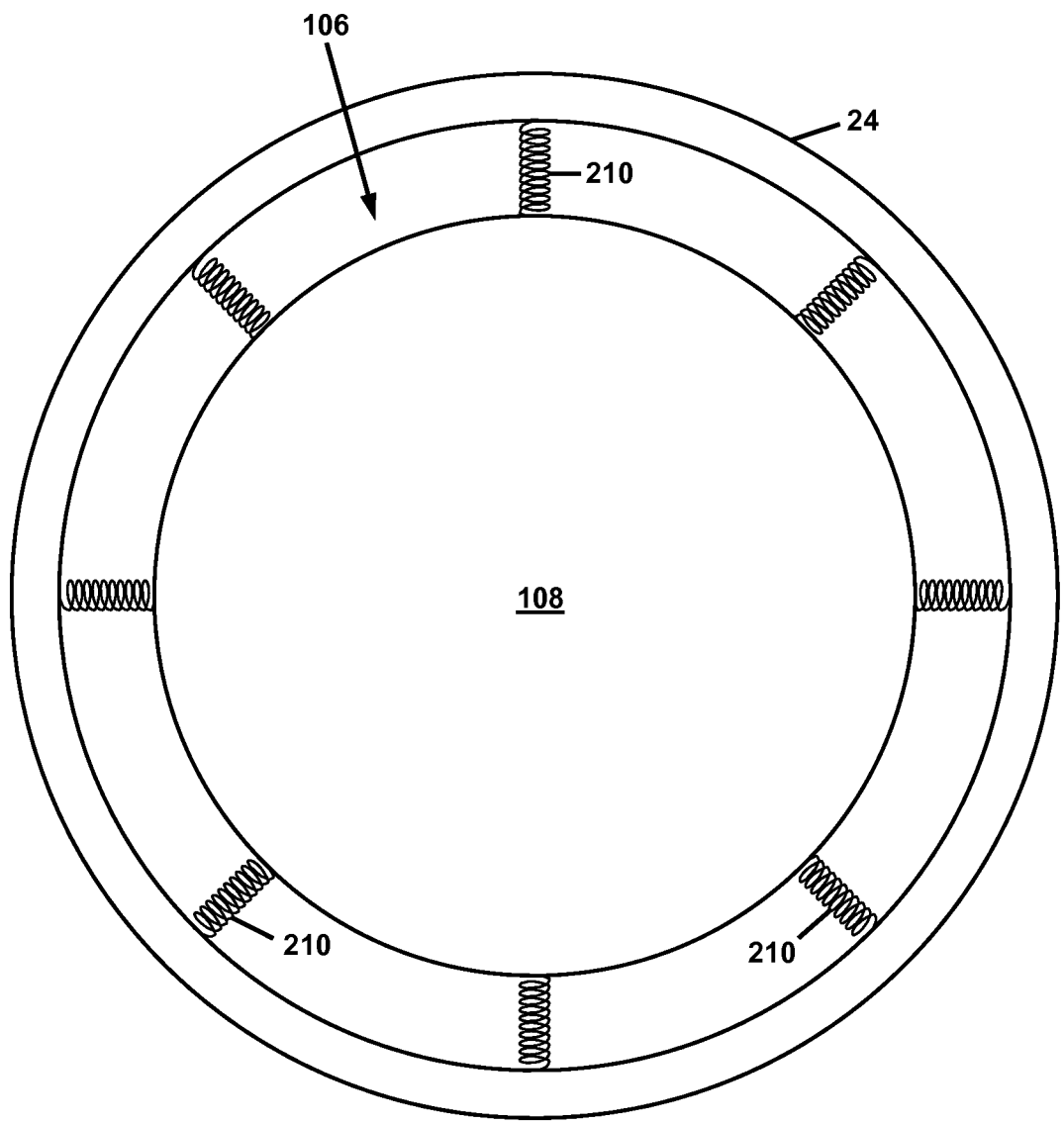
FIG. 6 is a schematic diagram of a portion of one embodiment of the wind energy recovery apparatus, wherein the wind receiving member of the apparatus is comprised of a web of material suspended by a plurality of elastic members.

Referring to FIG. 6, and in yet another alternative embodiment of a VWER apparatus, the wind receiving member 106 may comprise a web 108 of sheet material suspended from a structural frame member 24. The apparatus may be further comprised of a plurality of elastic members holding the web in tension. The plurality of elastic members may be springs 210, stretch (bungee) cords, or other suitable elastic means.

Figure 7:
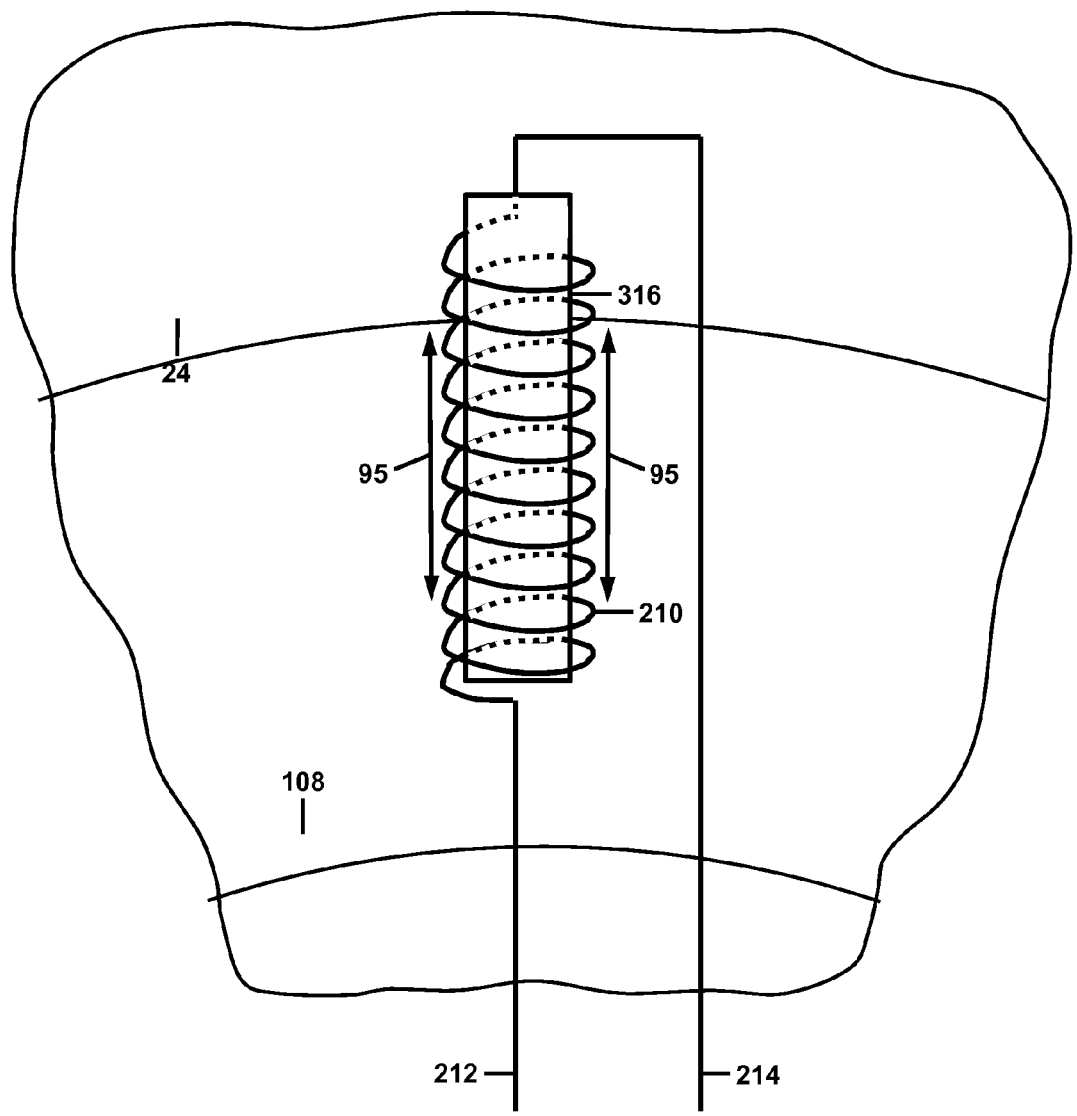
FIG. 7 is a detailed schematic diagram of one of the elastic members of FIG. 6, configured to generate electrical energy.

In a further embodiment depicted in FIG. 7, the springs 210 may be metal coil springs, with the apparatus being further comprised of a plurality of magnets 316. In such a configuration, each magnet 316 is joined at one end to either the structural frame member 24 or the web 108 of material. The springs are joined at opposed ends to the structural frame member 24 and the web 108 of material. In that manner, when the web 108 of material is buffeted by a variable velocity wind, the magnet 316 remains stationary with respect to the structural frame member 24 or the web 108 of material to which it is joined, while the coil spring 210 surrounding the stationary magnet 316 undergoes expansion and contraction relative to the magnet 316 as indicated by bidirectional arrows 95, thereby generating electrical energy. The coil springs 210 are in electrical communication with an energy storage device through conductors 212 and 214 attached to the opposed ends thereof, such that the electrical energy generated by the coil springs 210 may be stored in an energy storage device and/or conditioned and transferred to an electrical power transmission grid as described previously herein.

In this embodiment, the springs 210 serve the dual purpose as elastic members and first members of an electromagnetic generator. To increase the electrical energy output, the springs may be provided with a plurality of fine wire strands (not shown) joined to the main wound coil of the springs so as to provide a greater number of conductor turns around the magnet 316.

Figure 8A:
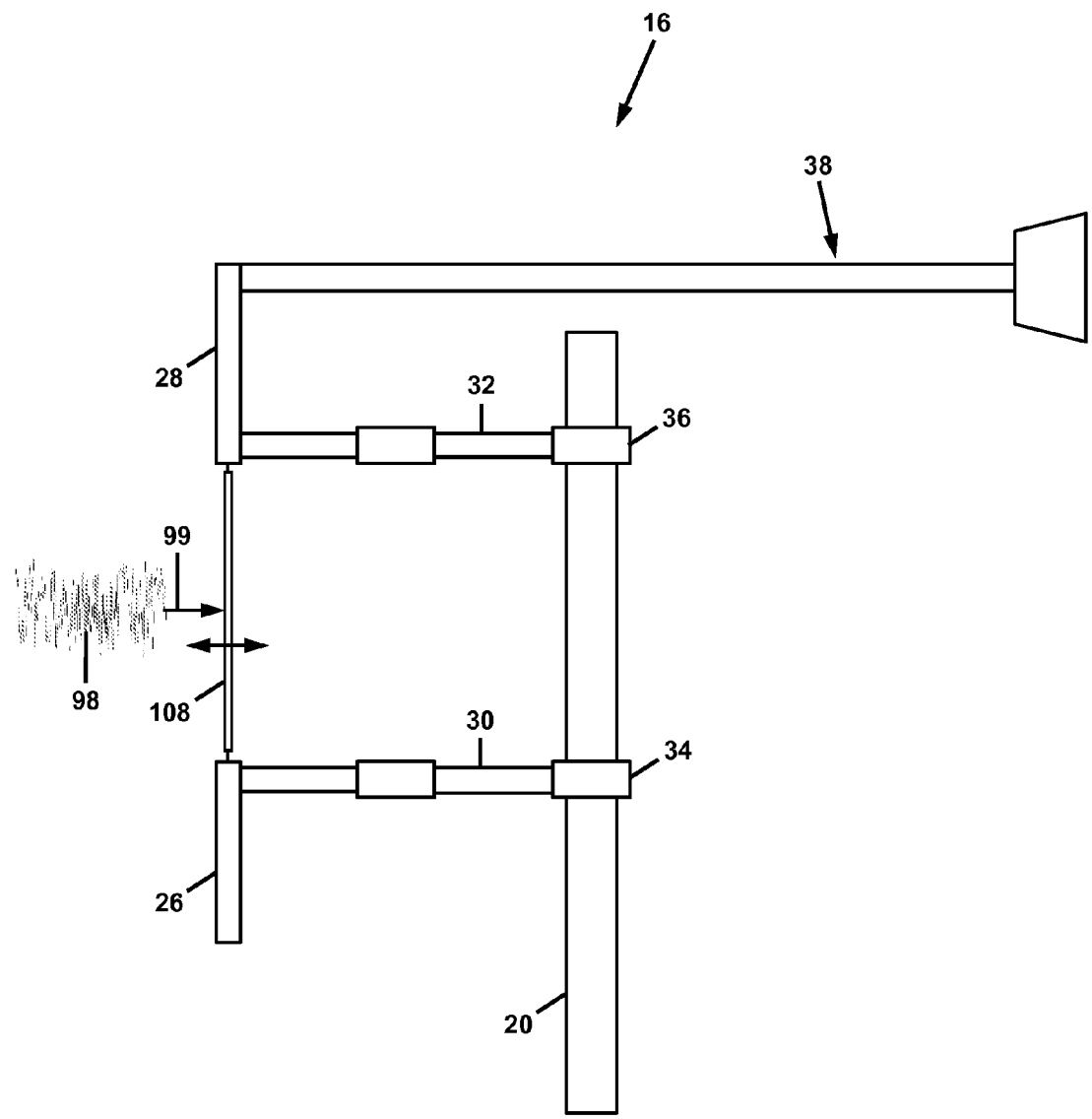
FIG. 8A is an illustration of a first wind receiving member having a configuration that is variable in response to the variable velocity of the wind from which energy is being recovered.

In order to obtain optimum energy conversion by the Applicants' VWER apparatus over a range of wind conditions, the configuration of the wind receiving member of the apparatus may be made variable in response to the variable velocity of the wind. In one embodiment of a VWER apparatus 16 depicted in FIG. 8A, the direction of orientation of the wind receiving member 320 relative to the wind velocity is variable. The apparatus 16 may be comprised of a wind receiving member such as web 108 of material connected to electrical energy generating means (not shown) as described previously. Other wind receiving members as described herein may also be suitable. The wind receiving member 108 is supported between structural members 26 and 28, which are in turn supported by arms 30 and 32. The arms 30 and 32 are joined to rotary bearings 34 and 36, which are joined to support member 20. A rudder 38 is joined to structural member 28, such that when a wind as indicated by arrow 99 and signal 98 is impinging upon the apparatus 16, the wind applies a drag force on the rudder 38. This drag force causes the apparatus 16 to rotate on support 20, thereby adjusting the angular position of the apparatus 16 so that the wind receiving member 108 is maintained substantially perpendicular to the direction of wind, regardless of any change in direction of the wind. In that manner, the amount of wind energy that is available to be recovered by the apparatus 16 is maximized.

Figure 8B:
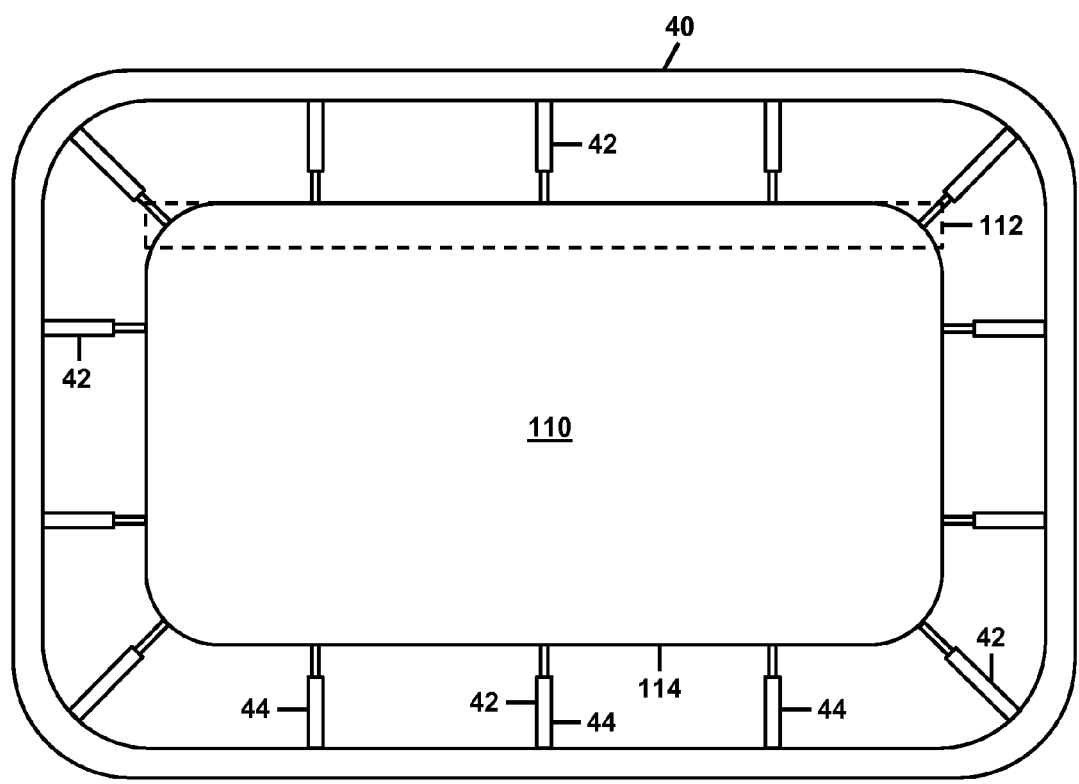
FIG. 8B is an illustration of a second wind receiving member having a configuration that is variable in response to the variable velocity of the wind from which energy is being recovered.

In another embodiments of the Applicants' VWER apparatus depicted in FIG. 8B, the surface area and/or the shape of the wind receiving member may be made variable in response to the variable velocity of the wind. The apparatus may be comprised of a wind receiving member 110 supported within a structural frame 40. In one embodiment, the wind receiving member 110 may be an elastic member, and may be suspended by a plurality of linear actuators 42, which may be operated so as to stretch the wind receiving member 110. In another embodiment, the wind receiving member 110 may be provided in a roll 112, such that certain linear actuators 44 connected to an opposed edge 114 may be operated to unroll the wind receiving member 110 in a "window shade" like manner.

In certain embodiments, the mass of the wind receiving member may be made variable in response to the variable velocity of the wind. In one such embodiment (not shown), the wind receiving member may be comprised of a thin web of material with hollow cavities formed therein. During operation, a suitable liquid may be pumped into or withdrawn from the cavities, thereby changing the mass of the wind receiving member. By providing capability to change the mass of the wind receiving member, the "force constant" of the system may be made variable, thereby providing the capability to tune the system for improved performance if the mean velocity of the wind changes, or, variable velocity wind has a particular noise (turbulence) pattern.

In other embodiments, combinations of direction, surface area, shape, and mass may be varied to obtain optimum energy conversion by the apparatus. These parameters may be controlled by a computer 380 (FIG. 1) that is programmed with algorithms to operate the VWER apparatus.

In certain wind conditions, the wind may be substantially laminar steady flow, i.e., the variation of wind velocity may be such that the energy from wind velocity variation alone that is available for recovery is low. In such circumstances, the Applicants' VWER apparatus may include a vortex-causing device configured to increase the velocity variations of the wind impinging upon the first wind receiving member. The Applicants have conceived such an implementation in the context of unaffected mean velocity capture, thereby improving the overall energy capture from wind with added variation. The increase in velocity variation may be an increase in the amplitude of the wind velocity, i.e. the scalar wind speed component of the wind velocity, or the variation of the directional component of the wind velocity, or a combination of both. Alternatively or additionally, the vortex-causing device may be configured to vary the frequency of velocity variations of the wind impinging upon the first wind receiving member. The variation in frequency may be either an increase in frequency, or a decrease in frequency, i.e., a "tuning" of the frequency to match the force constant of the elastic member of the apparatus.

Figure 9:
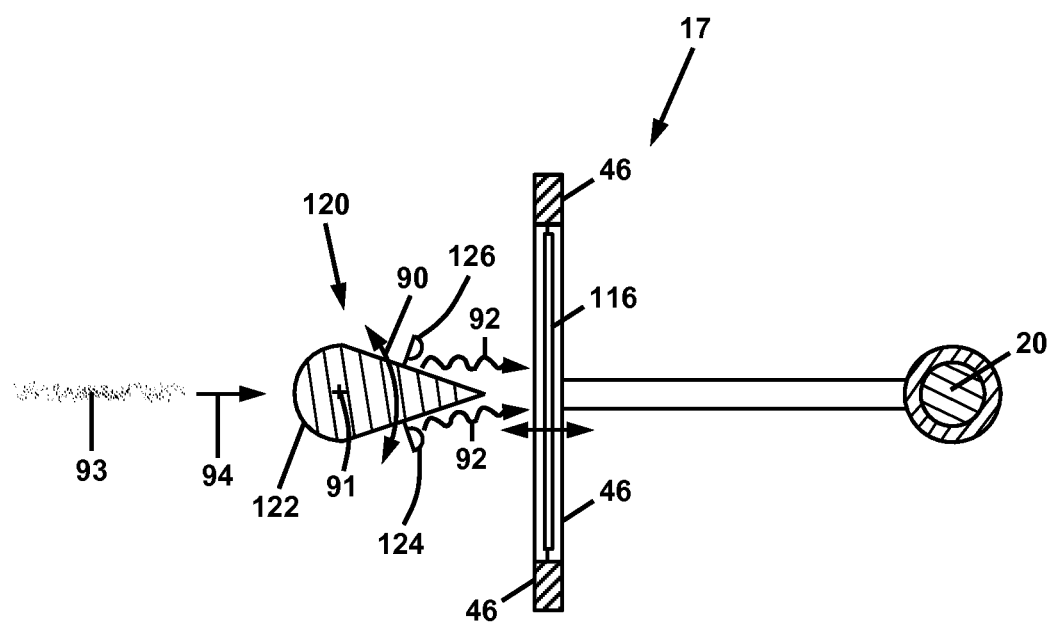
FIG. 9 is a schematic diagram of a portion of one embodiment of the wind energy recovery apparatus, further comprising a first vortex-causing device configured to increase the velocity variations of the wind impinging upon the wind receiving member.

By way of illustration, and not limitation, one example of a VWER apparatus that includes a vortex causing device is shown in FIG. 9. The apparatus 17, shown in a cross-sectional top view looking downwardly, is comprised of a wind receiving member 116 that is suspended between structural members 46. A wind with low velocity variation indicated by arrow 94 and low-noise signal 93 impinges upon the apparatus 17.

The apparatus 17 is further comprised of a vortex-causing device 120 that is disposed "upstream" and proximate to the wind receiving member 116. The vortex-causing device 120 is comprised of a wind obstruction object 122 that is configured to shed wind vortices, i.e. wind turbulence that impinges upon the wind receiving member 116. The wind vortices may be shed from alternating sides of the wind obstruction object as indicated schematically by wavy arrows 92. In certain embodiments, the wind obstruction object 122 may be mounted on a fixture (not shown) and made rotatable around a central axis 91. The object 122 may be further comprised of first and second wind anemometer cups 124 and 126 that are joined to opposed sides of the object 122. Thus when wind impinges upon the object 122, the onset of an instability will occur, slightly rotating the object, such that one of the cups 124 or 126 undergoes greater wind drag than the other. The object will then rotate in a manner that moves that cup out of the direction of the wind, but exposes the other of cups 124 and 126 to the wind, such that the direction of rotation of the object is reversed. The cycle then repeats, with the object undergoing oscillating motion as indicated by bidirectional arcuate arrow 90. Accordingly, the vortices, i.e. eddies of variable wind velocity indicated by arrows 92 will alternatingly be shed. These eddies will impinge upon the wind receiving member 116 and displace it, with the mechanical energy of the displacement being converted to electrical energy as described previously herein.

In another embodiment (not shown), the VWER apparatus may be mounted on a building or other structure and positioned such that the building functions as the vortex causing device. A wind, which may be in substantially laminar flow, impinges upon the building, resulting in turbulent flow around the building. Vortices are caused by the presence of the building, and the apparatus is mounted on the building and positioned to receive the variable velocity wind caused by the building.

Multiple units of the apparatus may be provided and mounted at the top or side edges of the building, so as to take advantage of multiple locations where turbulent wind occurs, regardless of the wind direction. In a further embodiment, the apparatus may be comprised of a mounting that can locate the wind receiving member at the location near a corner or edge of a building where the highest intensity turbulence occurs.

Location of the VWER apparatus on turbulence-causing structures other than buildings is contemplated. For example, the apparatus may be located at the sharp edge of a natural land formation, such as a cliff or sharp mountain peak, or jagged rock outcropping. The apparatus may also be located on a man-made structure, such as a pillar supporting a highway bridge, a pier, or a communications tower.

In certain embodiments, the frequency of oscillation of the wind obstructing object 120 may be made tunable to achieve a desired frequency and/or amplitude that is matched to the resonant frequency of the elastic member 200 (FIG. 1) of the means for converting mechanical wind energy to electrical energy of the apparatus 17. This may be accomplished by making the shape of the object variable, making the mass of the object variable (for example, by adding or removing liquid ballast from the object), or making the center of gravity of the object variable (for example, by relocating liquid ballast within the object).

It is to be understood that the wind obstructing object 120 illustrated in FIG. 9 is to be considered exemplary and not limiting. Other shapes and configurations of the object 120, which achieve the desired effect of causing variable wind velocity, i.e. wind turbulence, are contemplated. For example, in an alternative embodiment (not shown), the wind obstructing object may be comprised of a plate of material mounted on a single elastic rod, such that when wind impinges upon the plate, an instability occurs, resulting in oscillation of the plate on the elastic rod, and shedding of alternating vortices from opposed sides of the plate. It is to be understood that the wind obstructing object 120 may be oriented along other than a vertical axis as shown in FIG. 9.

Figure 10:
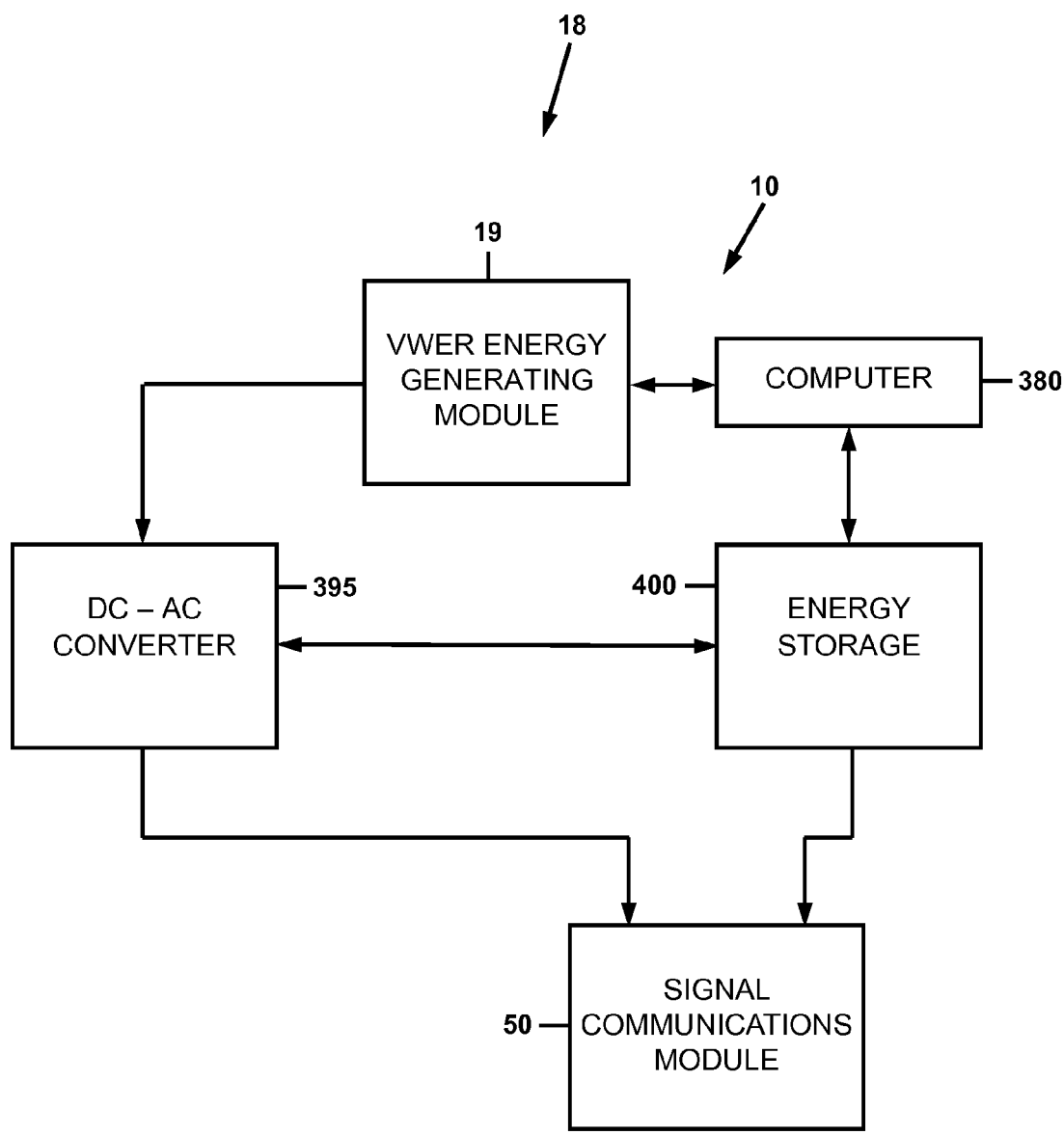
FIG. 10 is a schematic illustration of a self-powered signal communications system comprising the Applicants apparatus for recovery of variational wind energy that provides electrical power to the system.

The Applicants' VWER apparatus and methods have a broad range of uses. In one embodiment depicted in FIG. 10, the VWER apparatus may be used to provide backup power to a cell phone or other signal communications system. Referring to FIG. 10, a self-powered signal communications system 18 is provided comprising in general a VWER apparatus 10 of the present disclosure that provides electrical power to a signal communications module 50. The module 50 may be comprised of a mounting structure such as a tower, an antenna joined to the mounting structure, a transceiver in signal communication with the antenna, a controller in signal communication with the transceiver (all not shown). The Applicants' VWER apparatus 10 may be mounted on the mounting structure. The VWER apparatus 10 includes means for converting mechanical wind energy to electrical energy, i.e., VWER energy generating module 19, which may be comprised of a wind receiving member 100, an elastic member 200, and an electrical generator 300 (see FIG. 1). The VWER energy generating module 19 may also include an energy storage device 400, a DC-AC converter 395, and a computer 380 as described for apparatus 10 of FIG. 1.

The energy storage device 400 stores the electrical energy from the energy generating module 19 and provides the electrical energy to at least one of the antenna, the transceiver, and the controller of the signal communications module 50. The transceiver of the module 50 may be a signal repeater, and in certain embodiments, a cellular signal repeater used in cell phone communications.

The energy storage device 400 may be comprised of at least one battery. The signal communications module 50 may be connectable to a primary electrical power supply, and further comprised of means for detecting failure of the primary electrical power supply in communication with the controller, such that when a failure of the primary electrical power supply occurs, the controller switches the system to continue operation using electrical energy from the energy storage device 400.

Figure 11:
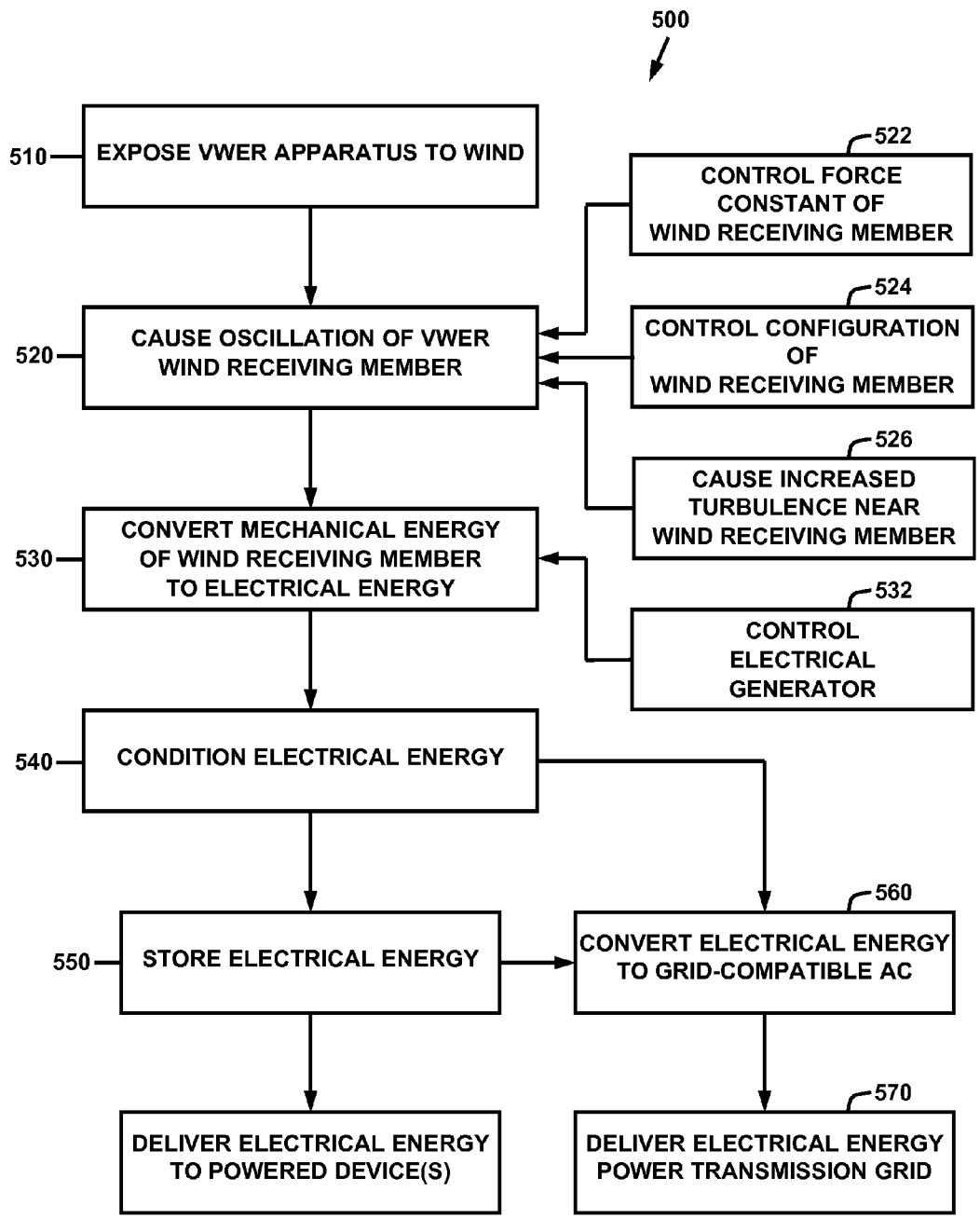
FIG. 11 is a flow chart of a method for recovery of variational wind energy in accordance with the present disclosure.

In accordance with the present disclosure, there is also provided a method of recovering variational wind energy. Referring to FIG. 11, the method 500 may include the steps of exposing 510 an apparatus comprising a wind receiving member coupled to an elastic member to a wind having a variable velocity, thereby causing 520 the wind receiving member to undergo oscillating motion, and converting 530 mechanical energy of the oscillating motion of the wind receiving member to electrical energy. The method 500 may further comprise storing 550 the electrical energy in a storage device, which may include at least one battery.

In certain embodiments, the oscillating motion of the wind receiving member in a first direction produces a first electrical energy having a voltage of a first polarity, and the oscillating motion of the wind receiving member in a second direction opposite the first direction produces a second electrical energy having a voltage of a second polarity opposite the first polarity, as described previously herein. In such a configuration, the method 500 may further comprise conditioning 540 the first and second electrical energy and storing 550 the conditioned first and second electrical energy in an energy storage device. In certain embodiments, the first and second electrical energy may be converted 560 to a third electrical energy having an AC voltage form compatible with an electrical power transmission grid, with the method 500 further comprising delivering 570 the third electrical energy to the electrical power transmission grid. In other embodiments, the method 500 may include delivering 580 the electrical energy to a powered device.

In certain embodiments, the elastic member may have a force constant that is variable, with the method 500 further comprising controlling 522 the force constant to maximize the electrical energy obtained from the apparatus.

In certain embodiments, the apparatus may further comprise an electrical generator operatively connected to the wind receiving member and configured to convert the mechanical energy of the oscillating motion of the wind receiving member to electrical energy. In such circumstances, the method 500 further comprises controlling 532 a resistance load on the electrical generator to maximize the electrical energy obtained from the apparatus.

In certain embodiments, the configuration of the wind receiving member may be variable in response to the variable velocity of the wind, with the method 500 further comprising controlling 524 the configuration of the wind receiving member to maximize the electrical energy obtained from the apparatus. The controlling 524 the configuration of the wind receiving member may include one or more of controlling the direction of orientation of the wind receiving member relative to the wind velocity (such as e.g., pitch and yaw angles), controlling the surface area of the wind receiving member, controlling the shape of the wind receiving member, and controlling the mass of the wind receiving member.

The method 500 may be further comprised of causing 526 increased turbulence in the wind proximate to the wind receiving member, thereby changing the oscillating motion of the wind receiving member, and increasing the electrical energy obtained from the apparatus. The change in oscillating motion may be one or more of increasing amplitude of the oscillating motion, increasing frequency of the oscillating motion, increasing force of the oscillating motion, or changing direction of the oscillating motion.

The Applicants have developed numerical analytical methods that enable rational decision making with regard to whether there is sufficient recoverable wind energy from wind velocity variation at a particular site. The Applicants' methods allow a determination that placement of the Applicants' apparatus at a particular site is justifiable in advance of such placement, instead of incurring the cost of apparatus fabrication, transportation, and installment, without knowledge that there is sufficient recoverable wind energy from wind velocity variation for the apparatus to perform its intended overall function, and to do so at a lower cost and in a more reliable manner than other alternatives. The Applicants' methods also enable characterization of the typical wind velocity variation at a particular site and design of a VWER apparatus configured to maximize energy recovery based upon such characterization.

Figure 12:
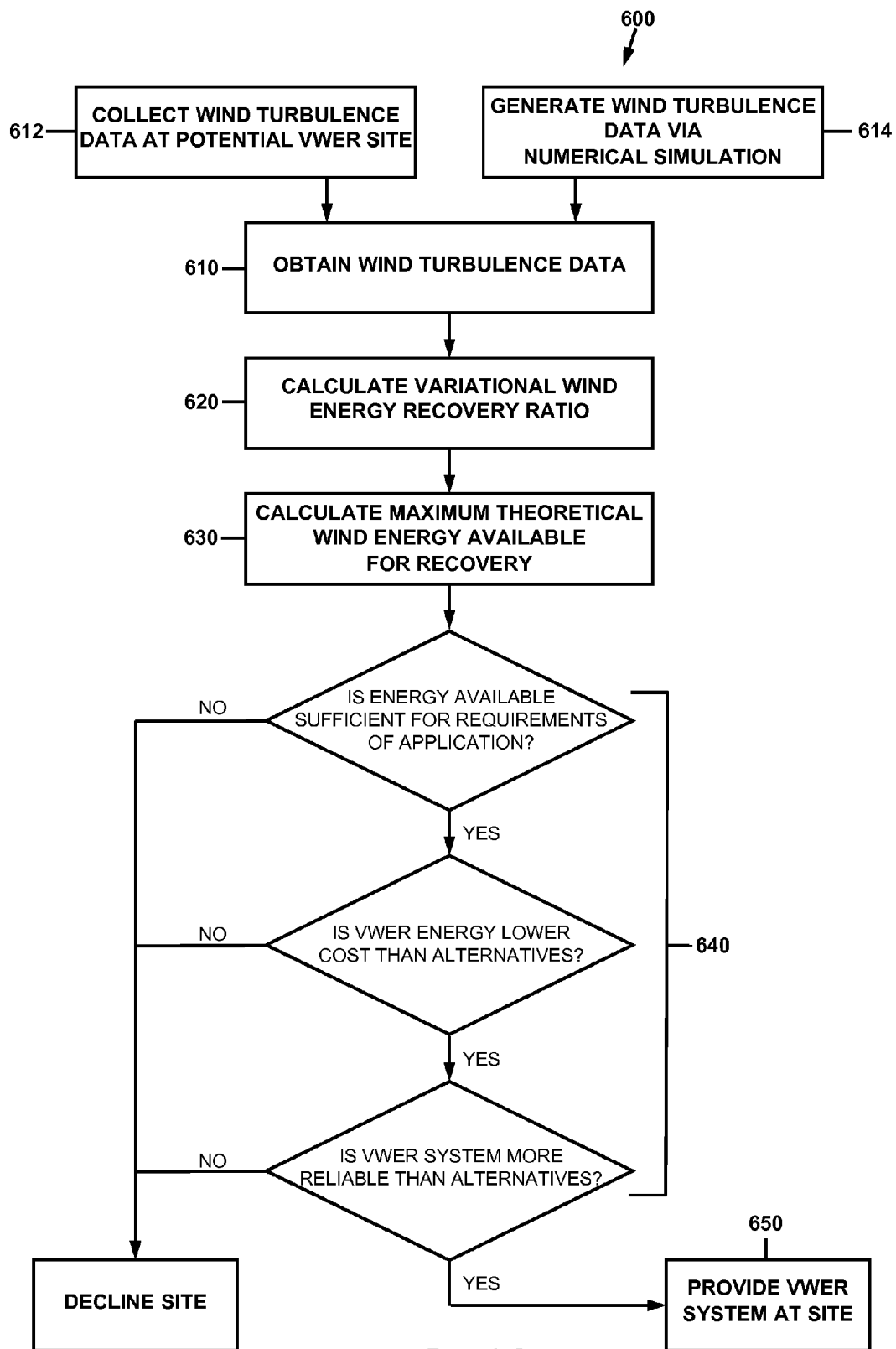
FIG. 12 is a flow chart of a method for identifying a site for recovering variational wind energy.

FIG. 12 is a flow chart of a method for identifying a site for recovering variational wind energy in accordance with the present disclosure. The method 600 comprises obtaining 610 wind turbulence data by performing one of collecting 612 wind turbulence data at the wind site or generating 614 wind turbulence data by a numerical simulation of wind at the wind site; calculating 620 a variational wind energy recovery ratio from the wind turbulence data; and calculating 630 the maximum theoretical wind energy from wind velocity variation available for recovery at the wind site.

A decision matrix 640 then ensues to determine if the maximum theoretical wind energy from variation relative to constant velocity wind energy is above a predetermined threshold value. If that is the case, the site is identified as being suitable for recovering variational wind energy, and the VWER apparatus is provided 650. Factors in the decision matrix 640 include whether the maximum wind energy recovery that is available is sufficient for the requirements of the application; whether the proposed VWER apparatus produces energy at a lower cost than alternatives; and whether the proposed VWER apparatus is more reliable than alternatives.

The Applicants have developed certain analyses and algorithms for executing steps 610-630 of their method 600, which will now be explained.

Wind as a Time Series Signal

It is possible to observe wind intuitively, in the signal processing sense, by observing the larger leaves on the smaller branches of various hardwood trees. When a steady wind blows, the leaves move away from the direction of the wind, often showing the underside of the leaves in groups. When a "gust" of wind hits the leaves an entire branch moves further than its rest position in the direction of the wind, then, as the "gust" vanishes, and the steady wind returns, the leaves take their former shape and the branch returns to its former position.

Wind, viewed as a continuously varying variable, may be viewed as and treated as a common time-sampled signal. Examples of signals commonly acquired in data acquisition are pressure, temperature, voltage, current, and fluid flow velocity. In data acquisition of temperature, for example, an estimate of the maximum sampling rate is made based on knowledge of the process response time needed, the instrument response time, and other considerations. Then, a data acquisition system may be assembled, which samples the analog signal output by the temperature transducer at an ND rate appropriate for the system of interest. At the end of the overall time of acquisition, a series of samples at evenly spaced time intervals is available for analysis.

In one aspect of the present invention, a wind velocity data acquisition system may be provided. The data acquisition system includes an instrument that reacts to wind velocity substantially instantaneously. Additionally, the data acquisition system can sample the signal from this wind velocity instrument at a frequency that can perfectly reconstruct the wind signal, otherwise known as the Nyquist frequency, or, 2N, where N is the highest frequency of variation contained within the wind itself. (In practice, a higher frequency than Nyquist may be used to re-construct complex signals).

Given that an average velocity exists for the wind, and around that average velocity, a maximum amplitude of variation may be defined, that is otherwise uniformly random, then a simulated (or "synthetic" or "virtual") wind may be constructed from Monte Carlo methods. It is desired to produce a synthetic, simulated signal that may be analogous to the signal that one visually senses by watching the trees sway in the wind.

Randomized, Uniform Distribution, Synthetic Wind Signal in Time

To initiate construction of a synthetic wind signal the average wind velocity V may be represented as a series of sampled constant values of array length 2N. A maximum amplitude of variation A is defined for each sample, modulated by a random number extracted from a uniform distribution and ranged between 0-1: Then, the average of all variation samples is subtracted from each of the various variation array samples. This generates a zero mean variation array, constrained by the maximum amplitude, randomly modulated between $-\frac{1}{2} A < 0 < \frac{1}{2} A$. Finally, the previous two generated sample arrays, average velocity and the randomly modulated array, are added together providing a wind signal with a constant mean velocity, fluctuating around a uniformly distributed, random, maximum variation amplitude of length 2N. For purpose of illustration in the following example, N is chosen to be 1500.

Figure 13:
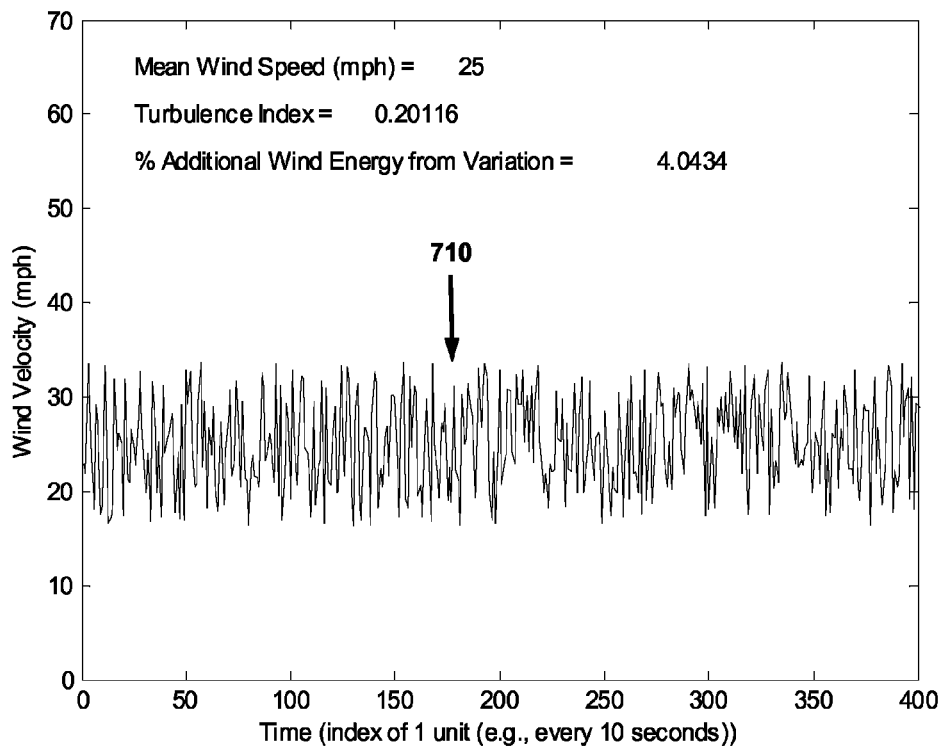
FIG. 13 is a graph of a simulated wind signal generated using a method of the present disclosure.

FIG. 13 depicts an example of a synthetic wind signal 710 generated in the above manner. In the above synthetic wind "signal," certain attributes of real wind are present, such as, when variation is present, there may be periods of relative calm (i.e., return to mean wind speed); a period of calm may be followed by a gust, and then the wind velocity may subside to a speed well below that of the mean.

It can be seen from FIG. 13 that when the average wind velocity is 25 miles per hour, the wind never subsides completely. (This fits the general observation of a natural 25 mph wind in that when wind is blowing strongly, it rarely suddenly drops to zero, then, moves back up to a high velocity).

Uniform Distribution Wind Time Domain Statistics and Turbulence Intensity

In the exemplary synthetic wind signal depicted in FIG. 13, the mean velocity of the wind is 25 mph, and the standard deviation of the wind velocity, in the time domain is 5.06. From the mean velocity of 25 mph, and the standard deviation of 5.06, one may compute a parameter known as the Turbulence Index, or TI, as described in the publication of J. F. Manwell et al., "Hybrid 2: A Hybrid System Simulation Model, Theory Manual" of the Renewable Energy Research Laboratory, Dept. of Mechanical Engineering, University of Massachusetts, Jun. 30, 2006). The Turbulence Index is equal to the ratio of the standard deviation of wind to the mean velocity of wind. For the simulated wind signal of FIG. 12, TI=5.06/25=0.201.

Uniform Distribution Wind Energy Spectral Response

The wind time signal 710 of FIG. 13 may be further decomposed via Fast Fourier Transform (FFT) methods. The energy associated with the FFT of the wind signal shown in FIG. 13 is shown below, where $$E_i \approx \frac{(FFT_i \cdot FFT_i^*)}{(2N)^2} \quad (1)$$

where the asterisk (*) represents the complex conjugate of $FFT_i$.

Various constants in the equation above are omitted, since the following analysis entails energy ratios in the calculation of the variational energy component of the wind signal, any such constants will cancel out.

Figure 14:
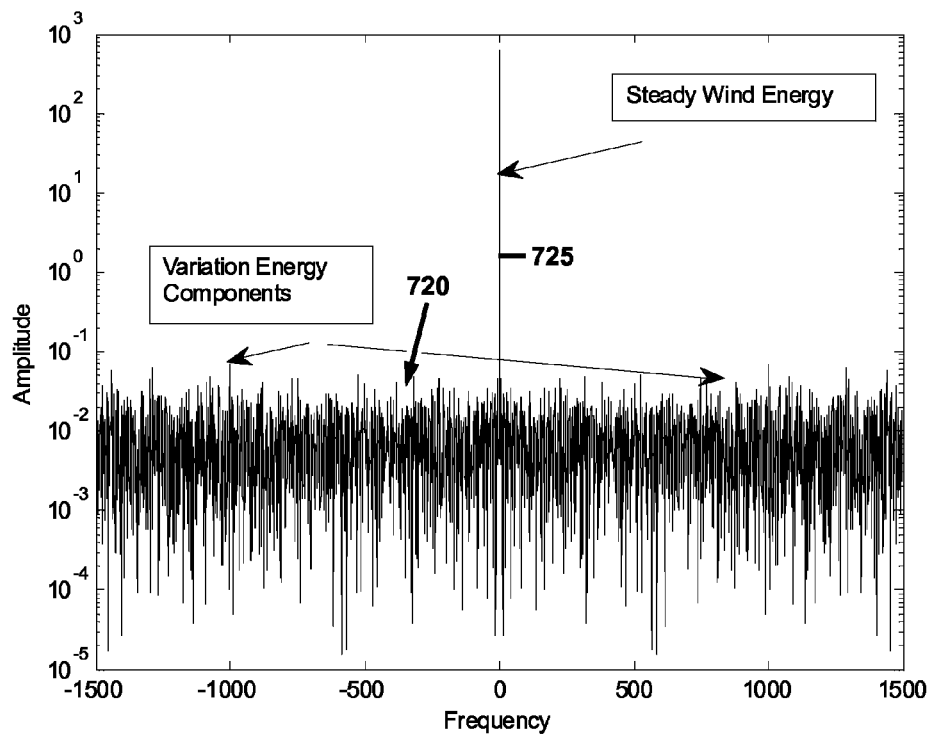
FIG. 14 is a graph of the energy spectrum of the simulated wind signal of FIG. 13.

FIG. 14 is a graph of the energy spectrum 720 of the simulated wind signal of FIG. 13. The zero frequency amplitude 725 of the FFT energy is directly proportional to the energy associated with the mean velocity of the "steady", non-varying component of the wind. The FFT of all other frequencies is associated with the energy contained within each fluctuation at that frequency. Since, in the present simulation, only purely randomized variation has been added, the resultant mean amplitude across all frequencies is the same (i.e., white noise).

Uniform Distribution Wind Energy Components (Steady Wind/Variation)

The total energy of the variational component of wind energy spectral response is as follows:

$$E_{VariationalWind} \approx \sum_{|i|>0} \frac{(FFT_i \cdot FFT_i^*)}{(2N)^2} \quad (2)$$

The energy associated with the steady wind is that at the zero frequency (i=0):

$$E_{SteadyWind} \approx FFT_0 \cdot FFT_0^* \quad (3)$$

(It is again noted that the "approximate" sign (≈) indicates that constants are ignored constants and only the FFT result outcomes are shown.)

Variational Wind Energy Recovery (VWER) Ratio

The Variational Wind Energy Recovery Ratio may now be determined as follows:

$$VWER = \frac{E_{VariationalWind}}{E_{SteadyWind}} \quad (4)$$

Since the total energy associated with a steady wind, and classic steady wind capture systems are well characterized, and for simple estimations of steady velocity systems, are easy to compute, deriving a function for the above ratio enables quick estimation of the "potential" associated with capturing wind variation.

Turning again to FIG. 13 and FIG. 14, the two components of energy contained within the wind signal of FIG. 13 may now be computed by using the spectral decomposition of FIG. 14.

For FIG. 13:

$$VWER = \frac{E_{VariationalWind}}{E_{SteadyWind}} = \frac{25.0}{625} = 0.04$$

Hence, the additional energy available from the rapid fluctuations in the wind velocity is about 4 percent, based on the TI specified as 0.2. It is noted that for large bladed wind energy harvesting devices, such as rotary wind turbines, this additional available energy is not harvested.

Randomized, Weibull Distribution, Synthetic Wind Signal in Time

Wind data reported in various publications indicates that sampled wind data may be fit to a Weibull distribution, with excellent fit of the real wind data to this probability density function. Accordingly, the present "uniform distribution simulator" is modified to create a Monte Carlo simulator for Weibull wind distribution.

Method of Monte Carlo Weibull Wind Creation

A Monte Carlo simulator may be utilized and programmed using a suitable software program such as Matlab, and is comprised of the following operations:

1. An array of random numbers between 0-1 are created having number of samples 2N.

2. The above array is scaled to span the input expectations for the Weibull distribution.

3. Utilizing k=1.8 (for this example) and λ=1 (Weibull parameters determining shape), the above data from step 2 are used to create the input/output Weibull distribution based on random input.

4. Normalize the data from steps 1-3 so that the input ranges from 0-1 and the Weibull output ranges from 0-1. A look up table is produced that related sorted input to Weibull output for the noted parameters.

5. Create a randomized, uniform array from 0-2N ranging for 0-1.

6. For each sampled point in step 5, perform input to output look up from the Weibull results of step 4. This sequentially converts the uniform distribution to a Weibull distribution at each sampled point thereby building a simulated, randomized "Weibull Wind."

7. The results of step 6 are ranged between 0-1 and can now be modulated with wind variation amplitude information.

8. Once step 7 converts the Weibull normalized sequence to wind variation, it can be added to a mean velocity to complete the construction of a complete wind signal with mean velocity modulated by random variation, but, strictly bounded by the Weibull probability density function.

The above sequence was programmed into Matlab and validated by cross referencing sampled results with the distribution expectation outcome.

Figure 15:
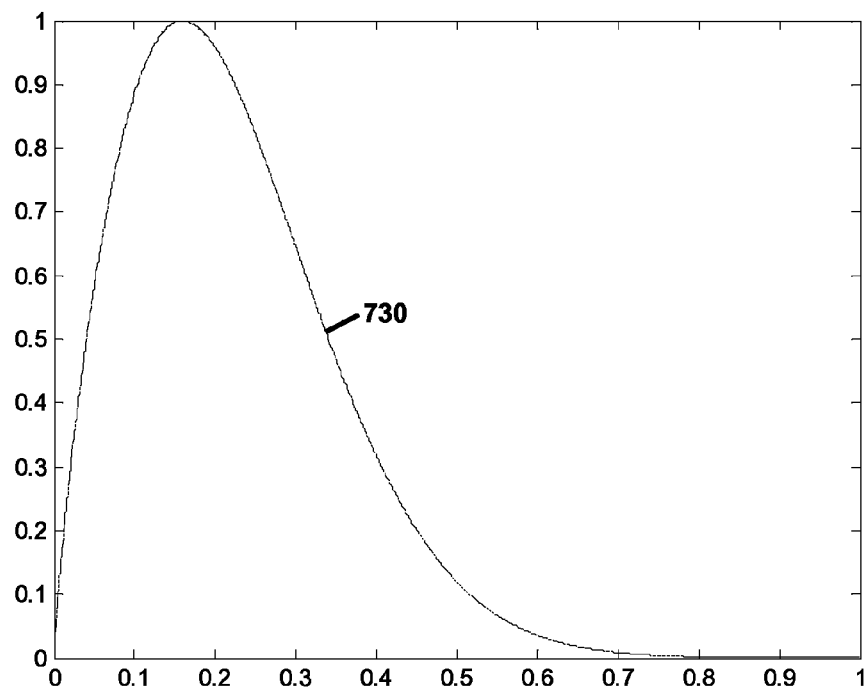
FIG. 15 is a graph of an exemplary Weibull Wind distribution generated using a method of the present disclosure.

An example simulator wind distribution for the Weibull distribution tuned to approximately mimic common wind distribution shapes is shown in FIG. 15. This normalized Weibull Wind distribution 730 is for k=1.8 and λ=1.0

Figure 16:
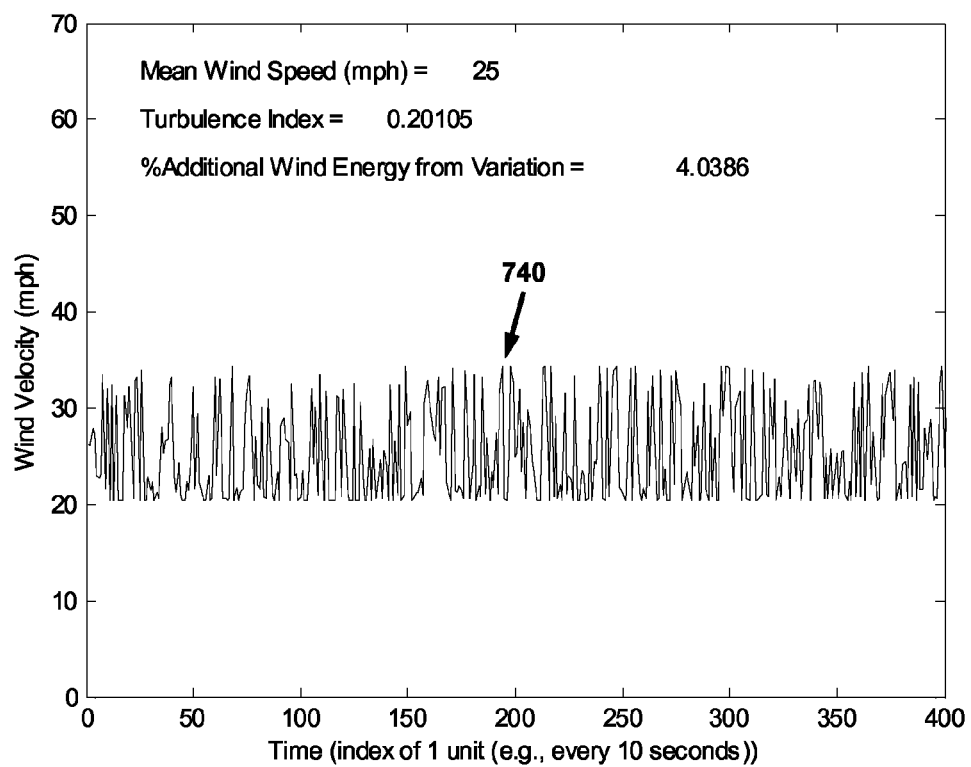
FIG. 16 is a graph of a wind time series with constant mean velocity and Weibull distribution variation generated using a method of the present disclosure.

From the procedure noted, and the distribution noted, a simulated Weibull Wind was created and is shown in FIG. 16. In other words, FIG. 16 is a graph of a wind time series with constant mean velocity and Weibull distribution variation.

Weibull Distribution Wind Time Domain Statistics and Turbulence Intensity

A comparison of FIG. 13 and FIG. 16 renders a significant result. FIG. 13 depicts a classic uniform distribution, randomized, "wind" signal. In FIG. 16, the Applicants have created a Weibull simulated "wind" signal 740 with almost exactly the same Turbulence Index.

It is noted that the wind energy recovery ratios of about 4% are nearly identical for the same Wind Turbulence Index of about 0.2, despite being derived from two very different probability density functions. This finding, that for two different distributions, a given TI results in the same energy recovery from variation, is of significant interest and utility in predicting the available recoverable wind energy due to wind velocity variation at a particular site.

Weibull Distribution Wind Energy Spectral Response

Figure 17:
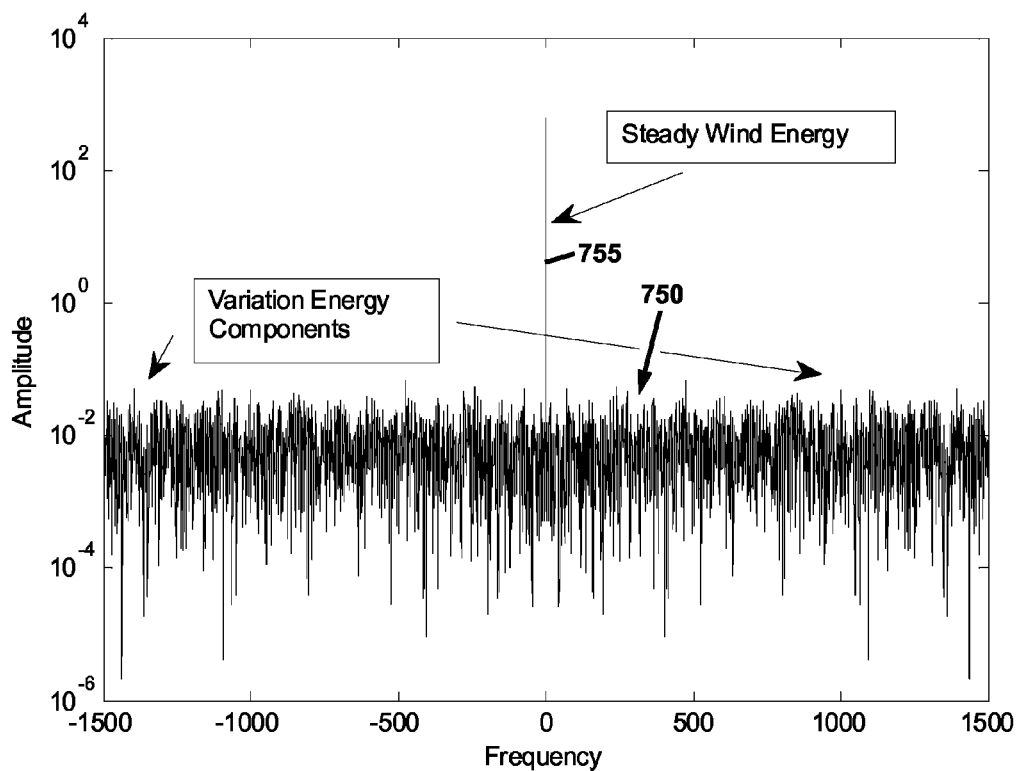
FIG. 17 is a graph of the energy spectrum of the simulated wind signal of FIG. 16.

Using Equations 1-4 above, the spectral energy response of the simulated wind signal may be computed. Application of the FFT to the signal in FIG. 16 is shown in FIG. 17.

Again, the zero frequency response 755 represents the energy available from classical steady wind operations with big bladed systems, and, all other frequency spectra 750 sum to the variational energy components of the wind.

Maximum Theoretical Wind Energy From Variation Relative to Steady Wind Energy

Having developed a wind time series creation simulator for two probability density functions, it is now possible to predict, from simulation, the maximum energy recovery available in wind variation relative to the steady wind component. This represents one method of calculating 630 the maximum theoretical wind energy from wind velocity variation available for recovery at the wind site, as referenced in FIG. 12.

In one embodiment of the present method, time series simulated winds at progressively increasing variation amplitude at a single constant velocity were created with both uniform distribution and Weibull distribution. This effectively provided the total energy of a steady wind and the total energy of the wind variation across a progressively increasing Turbulence Index. From this information, the relative ratio of Equation 4 was computed and plotted as a function of TI.

Figure 18:
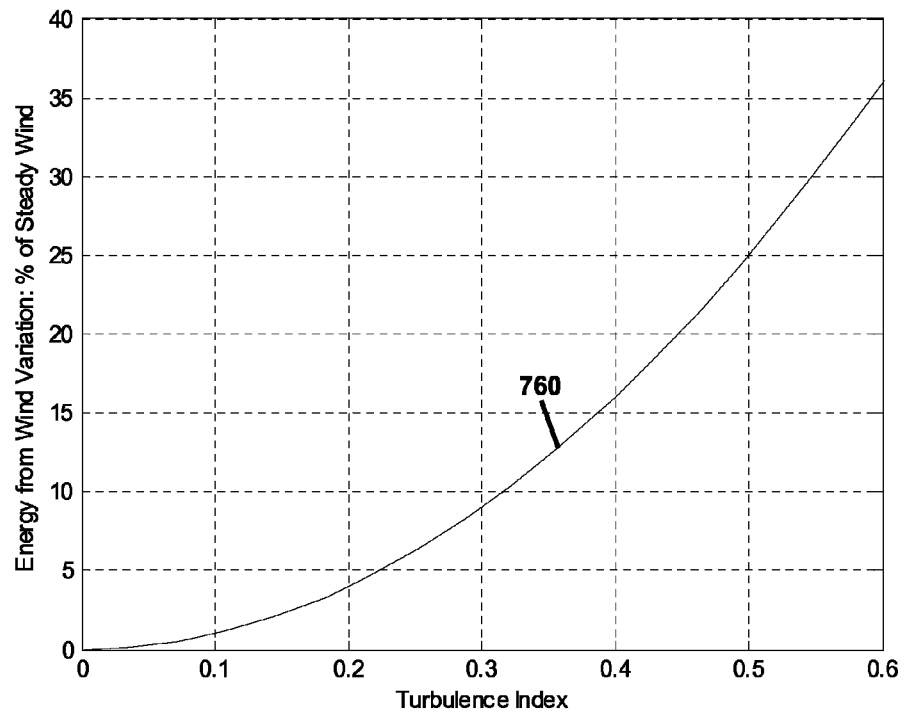
FIG. 18 is a graph of the available energy from wind variation as a percentage of energy from steady wind, generated using a method of the present disclosure.

FIG. 18 depicts the results of this computation. The Variational Wind Energy Recovery Curve 760 shows the predicted energy from wind variation available to be recovered, as a percentage of energy from steady wind.

The "Potential" of Wind Energy Variation—Using the VWER Curve

Several aspects of the preceding analysis and the Applicants' method are summarized as follows:

1. If there is provided an estimate for the average steady wind at a site, and a Turbulence Index statistical assessment of higher frequency wind gusts, then the additional energy available from the variation can be immediately assessed using the Applicants method. A decision as to whether or not to provide at the site a VWER system as disclosed herein can then be made, as set forth herein with reference to FIG. 12.

2. It has been determined that the VWER curve is the same for wind—for both uniform velocity distribution wind and the Weibull wind simulation. Accordingly, it is proposed the VWER curve 760 of FIG. 18 may be derived and used as a general curve for any wind distribution for VWER site predictive purposes.

3. In general, to get approximately an additional 5% extra energy recovery, over and above a classical bladed system capturing a steady wind, a Turbulence Index of greater than 0.25 is required.

4. For VWER candidate sites where rapid amplitude fluctuation in the wind occurs with a Turbulence Index above 0.25, significant energy is available to be recovered. The Applicants' VWER apparatus may be a viable option for wind energy harvesting at such sites.

For steady winds with little variation, the opportunity for recovering extra energy from that variation is low. However, for "frontal" shear zones leading a cold front, or sea to shore transition areas, or low mountainous areas where the Turbulence Index is high, the potential for energy recovery can be significant. Additionally, the use of the Applicants' VWER apparatus with a vortex generator as described herein with reference to FIG. 9 can increase the turbulence of an otherwise laminar wind, thereby rendering the Applicants' VWER apparatus effective for energy recovery.

It is, therefore, apparent that there has been provided, in accordance with the present invention, apparatus and methods for recovery of variational wind energy. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. An apparatus for recovery of energy from wind characterized as having velocity variations and an impinging direction, the apparatus comprising:
   a) a first wind receiving member displaceable in oscillatory motion along an axis in the impinging direction of the wind in response to received velocity variations of the wind impinging upon the member;
   b) a first elastic member coupled to the first wind receiving member; and
   c) an electrical generator operatively connected to the first wind receiving member and configured to convert mechanical energy of variable wind velocity induced oscillatory motion of the first wind receiving member to electrical energy.

2. The apparatus of claim 1, further comprising an energy storage device in communication with the electrical generator.

3. The apparatus of claim 1, wherein the elastic member has a force constant that is variable.

4. The apparatus of claim 3, wherein the force constant of the elastic member is tunable in response to the variable velocity of the wind.

5. The apparatus of claim 1, wherein the electrical generator is comprised of an electromagnetic inductor comprising a magnetic rod portion disposed within an electrically conductive coil portion, and wherein one of the magnetic rod portion or the conductive coil portion is joined to the first wind receiving member and movable with respect to the other portion, and wherein when the first wind receiving member is displaced, the magnetic rod portion of the electromagnetic inductor moves relative to the conductive coil portion of the electromagnetic inductor so as to convert mechanical energy of the first wind receiving member to electrical energy from the electromagnetic inductor.

6. The apparatus of claim 5, wherein the conductive coil has a first end and a second end, and wherein displacement of the first wind receiving member and magnet in a first direction generates an electrical potential of a first polarity across the first and second ends of the coil.

7. The apparatus of claim 6 wherein displacement of the first wind receiving member and magnet in a second direction opposite the first direction generates an electrical potential of a second polarity opposite the first polarity.

8. The apparatus of claim 7, wherein the apparatus is comprised of a first voltage gate in electrical communication with the first end of the coil of electrical conductor and with a first terminal of a first battery, and a second voltage gate in electrical communication with the first end of the coil of electrical conductor and with a first terminal of a second battery, and wherein motion of the magnet in the first direction causes the first battery to store electrical energy, and motion of the magnet in the second direction causes the second battery to store electrical energy.

9. The apparatus of claim 7, further comprising a voltage inverting device configured to convert the electrical energy from the electromagnetic inductor, to an AC voltage form compatible with an electrical power transmission grid.

10. The apparatus of claim 1, wherein the electrical generator is a rotary electrical generator, and the apparatus is further comprised of a linkage operatively connected to the first wind receiving member and the rotary electrical generator, the linkage converting linear motion of the first wind receiving member in the impinging direction of the wind to rotary motion of the rotary electrical generator.

11. The apparatus of claim 1, wherein the electrical generator is comprised of a piezoelectric membrane joined to the first wind receiving member such that displacement of the first wind receiving member applies a stress to the piezoelectric membrane in the impinging direction of the wind, thereby causing an electrical potential across two conductors in electrical communication with the piezoelectric membrane.

12. The apparatus of claim 11, wherein the piezoelectric membrane is the elastic member.

13. The apparatus of claim 1, wherein the elastic member is a spring.

14. The apparatus of claim 13, wherein the spring is a variable rate spring.

15. The apparatus of claim 1, wherein the elastic member is an elastic membrane.

16. The apparatus of claim 15, wherein the elastic membrane is the first wind receiving member.

17. The apparatus of claim 1, further comprising a vortex-causing device configured to increase velocity variations of the wind impinging upon the first wind receiving member.

18. The apparatus of claim 17, wherein the vortex-causing device increases the amplitude of the velocity variations of the wind impinging upon the first wind receiving member.

19. The apparatus of claim 17, wherein the vortex-causing device causes the directional component of wind velocity to vary in an oscillating manner.

* * * * *